United States Patent
Wakabayashi et al.

(10) Patent No.: US 9,264,105 B2
(45) Date of Patent: Feb. 16, 2016

(54) COMMUNICATION DEVICE AND FEEDER DEVICE

(71) Applicant: Funai Electric Co., Ltd., Daito, Osaka (JP)

(72) Inventors: Naoyuki Wakabayashi, Osaka (JP); Norito Tsujimoto, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 50 days.

(21) Appl. No.: 14/180,898

(22) Filed: Feb. 14, 2014

(65) Prior Publication Data

US 2014/0248836 A1    Sep. 4, 2014

(30) Foreign Application Priority Data

Mar. 4, 2013   (JP) ................. 2013-041508
Jun. 18, 2013   (JP) ................. 2013-127809

(51) Int. Cl.
*H04B 5/00* (2006.01)
*G06K 19/077* (2006.01)
*G06K 19/07* (2006.01)

(52) U.S. Cl.
CPC .......... *H04B 5/0031* (2013.01); *G06K 19/0716* (2013.01); *G06K 19/07703* (2013.01); *G06K 19/07707* (2013.01); *H04B 5/0037* (2013.01); *H04B 5/0043* (2013.01); *G06K 19/0723* (2013.01); *H04B 5/0062* (2013.01); *H04B 5/0075* (2013.01)

(58) Field of Classification Search
CPC . H04M 2250/12; H04W 88/02; H04W 24/00; H04B 1/3833; H04B 1/525; H01Q 7/00
USPC ............... 455/550.1, 562.1, 575.7, 41.1, 448, 455/274, 63.1; 343/894
See application file for complete search history.

(56) References Cited

U.S. PATENT DOCUMENTS

| | | | | |
|---|---|---|---|---|
| 5,008,647 | A * | 4/1991 | Brunt et al. | 340/432 |
| 7,250,865 | B2 * | 7/2007 | Maloney | 340/572.1 |
| 2008/0258679 | A1 * | 10/2008 | Manico et al. | 320/106 |
| 2010/0164833 | A1 * | 7/2010 | Dalmazzo | 343/894 |
| 2010/0201315 | A1 * | 8/2010 | Oshimi et al. | 320/108 |
| 2010/0201533 | A1 * | 8/2010 | Kirby et al. | 340/636.1 |
| 2011/0163857 | A1 | 7/2011 | August et al. | |

(Continued)

FOREIGN PATENT DOCUMENTS

JP    2010-130729 A    6/2010

OTHER PUBLICATIONS

Extended European Search Report of the corresponding European Application No. 14157573.8, dated Jul. 9, 2014.

*Primary Examiner* — Minh D Dao
(74) *Attorney, Agent, or Firm* — Global IP Counselors, LLP

(57) ABSTRACT

A communication device includes a sensor, an antenna, and a notification component. The sensor is configured to detect magnetic field strength. The antenna is configured to generate a magnetic field. The antenna is further configured to communicate with a wireless device that is configured to generate a magnetic field during communication. The notification component is configured to notify a positional offset between the antenna and the wireless device based on output signal indicative of the magnetic field strength. The sensor is arranged with respect to the antenna such that an effect of the magnetic field generated by the antenna on the output signal is suppressed.

14 Claims, 28 Drawing Sheets

(56) References Cited

U.S. PATENT DOCUMENTS

| | | | |
|---|---|---|---|
| 2011/0199274 A1* | 8/2011 | Dalmazzo | 343/760 |
| 2012/0235506 A1 | 9/2012 | Kallal et al. | |
| 2012/0262002 A1* | 10/2012 | Widmer et al. | 307/104 |
| 2012/0293330 A1* | 11/2012 | Grant et al. | 340/568.8 |
| 2013/0281155 A1* | 10/2013 | Ogata et al. | 455/556.1 |
| 2013/0328716 A1* | 12/2013 | Le Sage | 342/357.36 |
| 2015/0042271 A1* | 2/2015 | Nakagawa et al. | 320/108 |

\* cited by examiner

COMMUNICATION DEVICE AND FEEDER DEVICE

CROSS-REFERENCE TO RELATED APPLICATIONS

This application claims priority to Japanese Patent Application Nos. 2013-041508 filed on Mar. 4, 2013 and 2013-127809 filed on Jun. 18, 2013. The entire disclosures of Japanese Patent Application Nos. 2013-041508 and 2013-127809 are hereby incorporated herein by reference.

BACKGROUND

1. Field of the Invention

This invention generally relates to a communication device and a feeder device.

2. Background Information

Generally, an RFID (radio frequency identification) has been used to send and receive information by short-range wireless communication.

RFID tags are used for the RFID (hereinafter, an "RFID tag" will also be referred to as an "RF tag" or a "wireless device"). RFID tags have individual identification information in an internal memory, and perform communication with an RFID reader that makes use of radio waves or electromagnetism (hereinafter, an "RFID reader" will also be referred to as an "RF reader" or a "communication device").

RFID is used in a variety of fields, such as stock control and security management. Particularly in recent years, merchandise and service information, and URL information about merchandise and services, stored on RF tags are displayed a tablet terminal by communicating with the RF tag and the tablet terminal, which serves as an RF reader. When a tablet terminal acquires URL information, the web page at that URL can be opened with a browser, either automatically or after user authorization.

Large tablet terminals have debuted in recent years. The antenna used to communicate with the RF tag is usually disposed in an area on the rear face side, inside the tablet terminal. Therefore, in communication with an RF tag, the rear face of the tablet terminal is moved closer to the RF tag. However, it is difficult for the user to grasp the relation between the RF tag and the antenna on the rear face of the tablet terminal. This results in positional offset. Particularly if the tablet terminal is larger in size, there tends to be a great deal of positional offset between the antenna and the RF tag.

Patent Literature 1 (Japanese Unexamined Patent Application Publication No. 2010-130729) discloses a charging device that performs charging by receiving electrical power from a transmission device. The charging device includes four magnetic sensors. The coil magnetic flux (or magnetic force) generated from the transmission device is detected by these magnetic sensors, thereby determining the positional relation between the transmission device and the charging device. The user can be prompted to set the positional relation between the transmission device and the charging device to a positional relation that is suited to charging. Specifically, an arrow is displayed on the display component of the charging device based on the positional relation determined.

SUMMARY

An antenna of an RF reader generates a magnetic field when current flows to the antenna. This magnetic field is detected by the magnetic sensors of the RF reader. That is, the magnetic sensors detect both the magnetic field generated from the RF tag and the magnetic field generated from the RF reader. This makes it difficult to determine accurately the position of the RF tag based on the detection result.

Even with a system that sends electrical power from a feeder device to a receiver device in a non-contact fashion (i.e., without requiring any physical or electrical connection), the magnetic sensors of the feeder device detect both the magnetic field that is generated from the feeder element of the feeder device, and the magnetic field that is generated from the receiver element of the receiver device based on the magnetic field generated from the feeder element. Therefore, it is difficult for the feeder device to determine accurately the position of the receiver device.

One aspect is to provide a communication device with which a position of a wireless device can be detected at high accuracy. Another aspect is to provide a feeder device with which a position of a receiver element of a receiver device.

In view of the state of the known technology, a communication device includes a sensor, an antenna, and a notification component. The sensor is configured to detect magnetic field strength. The antenna is configured to generate a magnetic field. The antenna is further configured to communicate with a wireless device that is configured to generate a magnetic field during communication. The notification component is configured to notify a positional offset between the antenna and the wireless device based on output signal indicative of the magnetic field strength. The sensor is arranged with respect to the antenna such that an effect of the magnetic field generated by the antenna on the output signal is suppressed.

Furthermore, in view of the state of the known technology, a feeder device includes a sensor, a feeder element, and a notification component. The sensor is configured to detect magnetic field strength. The feeder element is configured to generate a magnetic field. The feeder element is further configured to perform a non-contact electrical power transmission to a receiver element of a receiver device. The notification component is configured to notify a positional offset between the antenna and the receiver element based on output signal indicative of the magnetic field strength. The sensor is arranged with respect to the feeder element such that an effect of the magnetic field generated by the feeder element on the output signal is suppressed.

Also other objects, features, aspects and advantages of the present disclosure will become apparent to those skilled in the art from the following detailed description, which, taken in conjunction with the annexed drawings, discloses one embodiment of the communication device and the feeder device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Referring initially to FIGS. 1 to 15, an RFID system is illustrated that is equipped with an RF tag 1 and an RF reader 2 in accordance with a first embodiment. In the illustrated embodiment, while the RF tag 1 and the RF reader 2 are illustrated as examples of the wireless device and the communication device of the present invention, it will be apparent to those skilled in the art from this disclosure that the present invention can be applied to different types of wireless devices and communication devices.

Figure 1:
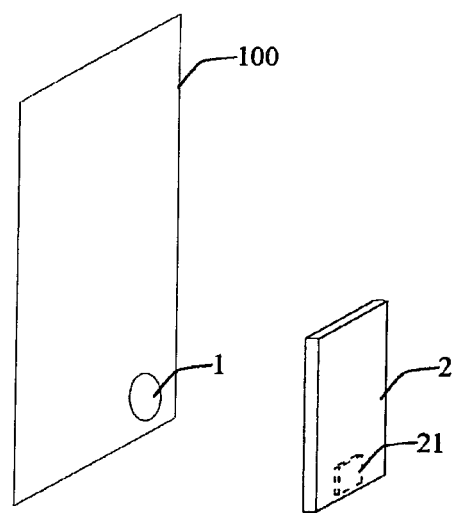
FIG. 1 is a schematic diagram of an RFID system in accordance with a first embodiment.
Figure 2:
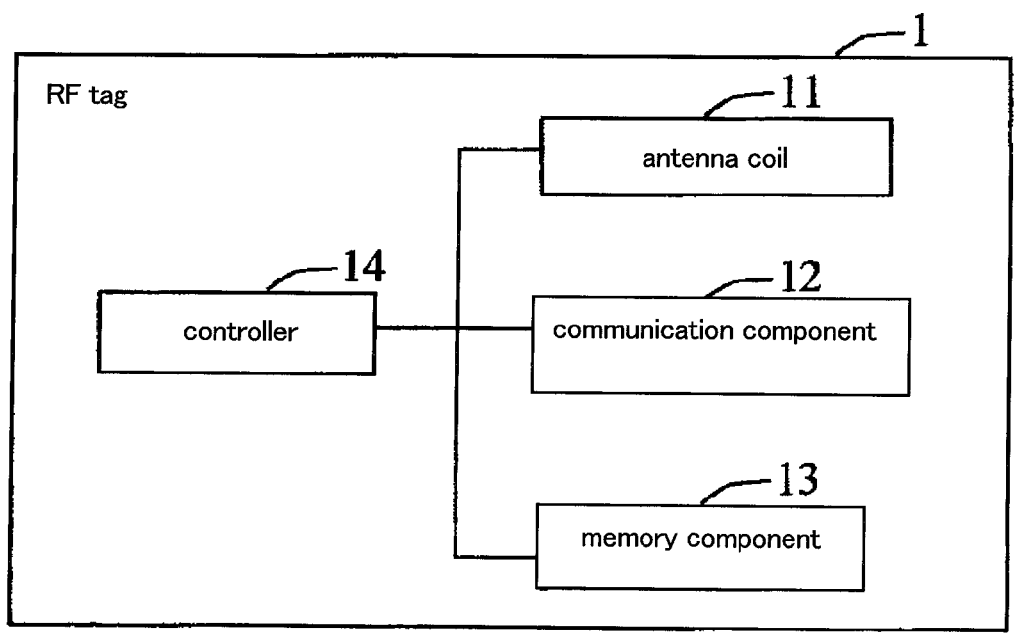
FIG. 2 is a block diagram of an RF tag (e.g., a wireless device) of the RFID system illustrated in FIG. 1.
Figure 3:
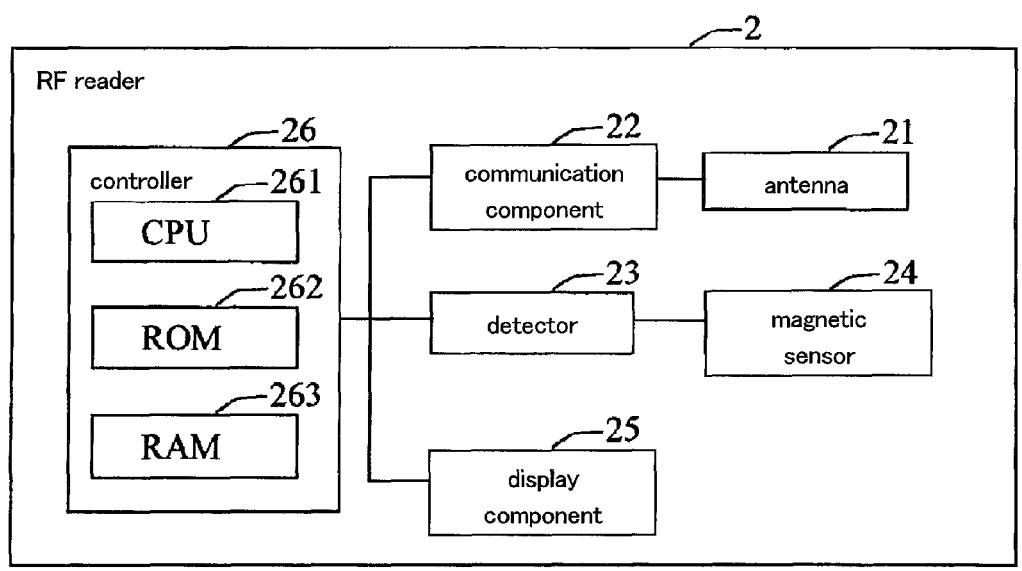
FIG. 3 is a block diagram of an RF reader (e.g., a communication device) of the RFID system illustrated in FIG. 1.

FIG. 1 is a simplified diagram of an example of an RFID system. FIG. 2 is a diagram of an example of the configuration of the RF tag 1 (e.g., the wireless device). FIG. 3 is a diagram of an example of the configuration of the RF reader 2 (e.g., the communication device).

The RF tag 1 is attached to a poster 100 or the like as shown in FIG. 1, for example. The user can acquire information from the RF tag 1 by moving an antenna coil 21 (discussed below) of the RF reader 2 close to the RF tag 1. In FIG. 1, the antenna coil 21 is disposed in an area in the lower middle part of the rear face of the RF reader 2. However, there are no particular restrictions about where on the RF reader 2 the antenna coil 21 is disposed.

Referring now to FIG. 2, the RF tag 1 will now be described. The RF tag 1 in this embodiment is a passive tag. A passive tag is a tag that operates by non-contact power transmission from the RF reader 2. The passive tag has no built-in battery or other such power supply. The RF tag 1 can instead be an active tag, however. An active tag is a tag that has an internal power supply. The active tag emits radio waves under its own power during communication. Thus, the communication distance is longer than with a passive tag.

As shown in FIG. 2, the RF tag 1 includes an antenna coil 11 (e.g., an antenna), a communication component 12, a memory component 13, and a controller 14. Transmission of data signals and drive energy by electromagnetic induction can be accomplished with an RFID system by moving the antenna coil 21 of the RF reader 2 (discussed below) close to the antenna coil 11 so that they are electromagnetically coupled. When current flows to the antenna coil 11, a magnetic field is generated, which affects the antenna coil 21 of the RF reader 2. A commonly used frequency for the electromagnetic waves, such as 13.56 MHz, can be used, or some other frequency can be used instead. The communicable distance between the antenna coil 11 and the antenna coil 21 of the RF reader 2 is preset to a range of about a few centimeters to a few dozen centimeters, for example.

The communication component 12 outputs to the antenna coil 11 a transmission signal obtained by subjecting the data sent to the RF reader 2 to specific encoding and modulation. The antenna coil 11 that has acquired a transmission signal sends the data to the RF reader 2 by electromagnetic induction.

The memory component 13 is a memory means for storing various kinds of information. An EEPROM is used, for example. The memory component 13 stores an identification number for the RF tag 1, information to be transmitted to the RF reader 2, and other such information.

The controller 14 is a control means or processor for controlling the entire RF tag 1. The controller 14 sends the data stored in the memory component 13 through the communication component 12 and the antenna coil 11 to the RF reader 2, according to a read request received from the RF reader 2.

Referring now to FIG. 3, the RF reader 2 will now be described. The RF reader 2 includes the antenna coil 21 (e.g., an antenna), a communication component 22, a detector 23, a magnetic sensor 24, a display component 25, and a controller 26.

The antenna coil 21 includes a loop antenna that is wound in a flat, annular spiral on a substrate (not shown). The two ends of the antenna coil 21 are connected to the communication component 22 of the RF reader 2 via terminals (not shown). When current flows to the antenna coil 21, a magnetic field is generated at the antenna coil 21. As discussed above, the transmission of data signals and drive energy can be accomplished by moving the antenna coil 21 close to the antenna coil 11 of the RF tag 1 such that it is electromagnetically coupled with the antenna coil 11 of the RF tag 1.

The communication component 22 acquires data inputted from the antenna coil 11 of the RF tag 1 to the antenna coil 21. The communication component 22 reads data obtained by subjecting the acquired data to specific demodulation and decoding.

The detector 23 inputs to the controller 26 the output signal (or detection result) of the magnetic sensor 24. The magnetic sensor 24 detects the strength of the magnetic field generated from the antenna coil 11 of the RF tag 1. The magnetic sensor 24 detects the strength of the magnetic field in the superposition direction of the antenna coil 21 and the antenna coil 11 of the RF tag 1 (see FIG. 4, discussed below). The magnetic sensor 24 is formed by a pickup coil, a magnetic resistance element (MR element), a Hall element, a magnetic impedance element (MI element), or the like. In this embodiment, the RF reader 2 includes one or more magnetic sensors 24. The layout of the magnetic sensor 24 will be discussed in detail below.

The display component 25 displays a specific image or video. The display component 25 in this embodiment also serves as an interface unit having a touch panel function. However, a separate interface unit with or without a touch panel function can be used instead. Information indicating the direction of the RF tag 1 is displayed on the display component 25, as discussed below.

The controller 26 is a control means or processor for controlling the entire RF reader 2. The controller 26 includes a CPU 261, a ROM 262, and a RAM 263. Programs to be executed by the controller 26. Parameters and data necessary for the execution of these programs are stored in the ROM 262. The CPU 261 executes various kinds of program stored in the ROM 262. The RAM 263 temporarily stores data obtained as a result of various kinds of processing, and data obtained in the course of various kinds of processing. The CPU 261, ROM 262, RAM 263, etc., are connected via a bus. Some or all of the CPU 261, ROM 262, and RAM 263 can be integrated into a single chip.

The controller 26 determines the position and/or direction of the RF tag 1 based on the output signal of the magnetic sensor 24 inputted from the detector 23. The controller 26 displays information indicating the position and/or direction of the RF tag 1 on the display component 25. How the position of the RF tag 1 is determined and its display on the display component 25 will be discussed in detail below.

Figure 4:
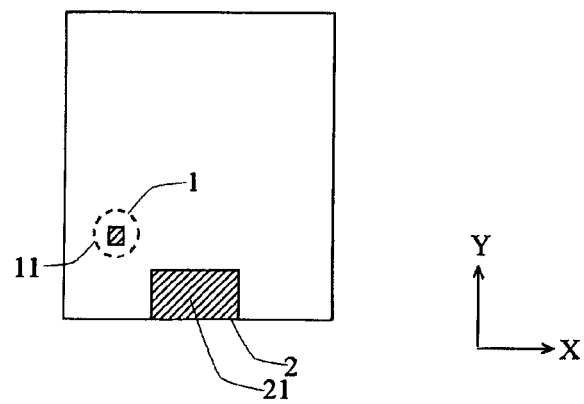
FIG. 4 is a plan view of the RF tag and the RF reader, illustrating that the RF tag and the RF reader are in a state of positional offset.
Figure 5:
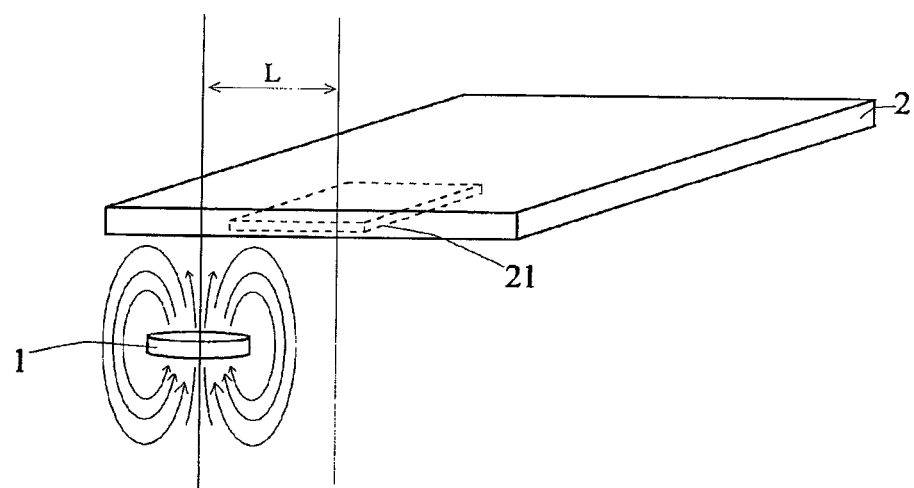
FIG. 5 is a perspective view of the RF tag and the RF reader, illustrating that the RF tag and the RF reader are in a state of positional offset.
Figure 6:
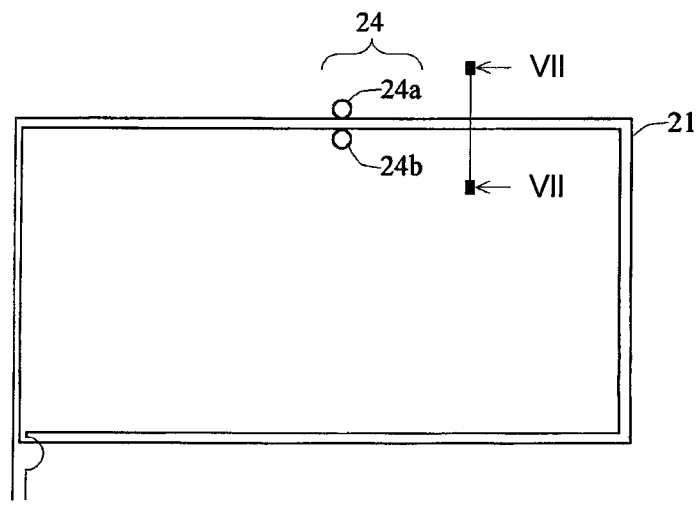
FIG. 6 is a plan view of a first example of the internal configuration of the RF reader.
Figure 7:
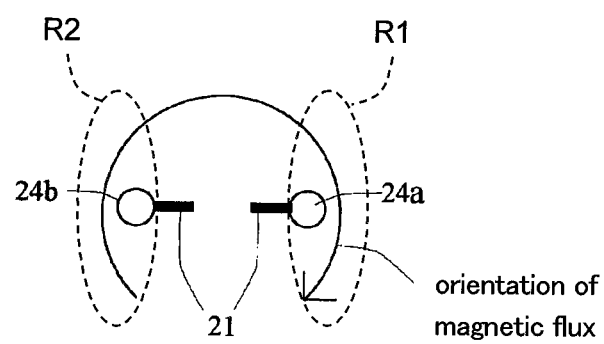
FIG. 7 is a cross sectional view of the RF reader, taken along VII-VII line in FIG. 6.

Next, the layout of the magnetic sensor 24 in the RF reader 2 will be described through reference to FIGS. 4 and 5. FIG. 4 is a plan view of when the RF tag 1 and the RF reader 2 are in a state of positional offset. FIG. 5 is an oblique view of when the RF tag 1 and the RF reader 2 are in a state of positional offset. FIG. 6 is a plan view of an example of the internal configuration of the RF reader 2. FIG. 7 is a lateral cross section along the VII-VII line in FIG. 6.

As discussed above, the communicable distance between the antenna coil 11 and the antenna coil 21 is set to between about a few centimeters and a few dozen centimeters. In particular, when the communicable distance is set to a few centimeters, the RF reader 2 can not read the information of the RF tag 1 if the positional offset between the antenna coil 11 and the antenna coil 21 is large when the RF reader 2 is moved toward the RF tag 1.

This "positional offset" between the antenna coil 11 and the antenna coil 21 refers to a state in which the antenna coil 11 is not present within the region of the antenna coil 21 (i.e., the region indicated by the hatching lines in FIG. 4) when projected in the superposition direction of the antenna coil 11 and the antenna coil 21 (i.e., the direction perpendicular to the paper plane in FIG. 4) while the RF reader 2 is moved toward the RF tag 1, as shown in FIG. 4. More precisely, as shown in FIG. 5, this phrase refers to a state in which the distance between the center axis of the antenna coil 21 and the center axis of the antenna coil 11 is at least a specific distance L. In the illustrated embodiment, the specific distance L can be the communicable distance, or it can be any distance that is less than the communicable distance.

As shown in FIGS. 4 and 5, if the positional offset has occurred, then there can be communication problems, depending on the communicable distance between the antenna coil 11 and the antenna coil 21. Therefore, in this embodiment, the controller 26 determines the position and/or direction of the RF tag 1 based on the output signal of the magnetic sensor 24 that is inputted from the detector 23.

Then, the controller 26 displays information indicating the position and/or direction of the RF tag 1 on the display component 25.

As discussed above, the magnetic sensor 24 detects the strength of the magnetic field generated from the antenna coil 11. However, the magnetic sensor 24 also detects the strength of the magnetic field generated from the antenna coil 21. The strength of the magnetic field generated from the antenna coil 11 is weaker than the strength of the magnetic field generated from the antenna coil 21, particularly when the RF tag 1 is a passive tag. Thus, it is conceivable that the magnetic sensor 24 will detect mainly the strength of the magnetic field generated from the antenna coil 21.

In view of this, the magnetic sensor 24 is disposed at a position where it is less likely that a signal indicating the strength of the magnetic field generated from the antenna coil 21 will be included in the output signal of the magnetic sensor 24. In this embodiment, as shown in FIG. 6, the magnetic sensor 24 only includes two magnetic sensors 24a and 24b (e.g., two magnetic sensor elements). These magnetic sensors 24a and 24b are made of magnetic resistance elements.

As shown in FIG. 7, the magnetic field generated from the antenna coil 21 has a first region R1 and a second region R2 with mutually opposite orientations or directions of the magnetic flux. The magnetic sensors 24a and 24b are respectively disposed at positions that allow the detections of the strength of the magnetic field in part of the first region and the strength of the magnetic field in part of the second region, out of the magnetic field generated from the antenna coil 21. This will now be described in detail through reference to FIGS. 6 and 7. In the following description, the fact that the magnetic sensors 24a and 24b detect the strength of the magnetic field in part of the first region and in part of the second region, respectively, will also be stated simply as "detects the strength of the magnetic field in the first region and the second region." In the illustrated embodiment, as shown in FIG. 7, the first region R1 is located outside the antenna coil 21, while the second region R2 is located inside the antenna coil 21.

As shown in FIG. 6, the magnetic sensors 24a and 24b are respectively disposed at a position where the strength of the magnetic field in part of the first region outside of the antenna coil 21 is detected, and a position where the strength of the magnetic field in part of the second region inside of the antenna coil 21 is detected. The detector 23 obtains a magnetic field strength by adding the strength of the magnetic field of the antenna coil 21 detected by the magnetic sensor 24a to the strength of the magnetic field of the antenna coil 21 detected by the magnetic sensor 24b. The detector 23 outputs the magnetic field strength to the controller 26 as the strength of the magnetic field of the antenna coil 21 detected by the magnetic sensor 24.

As shown in FIG. 7, in the illustrated embodiment, the magnetic sensors 24a and 24b are disposed in the first region and the second region, respectively, with the antenna coil 21 in between. Thus, the orientation of the magnetic flux detected by the magnetic sensor 24a is substantially the opposite of the orientation of the magnetic flux detected by the magnetic sensor 24b. Therefore, if the absolute values of the strength of the magnetic field of the antenna coil 21 detected by the magnetic sensors 24a and 24b are substantially the same, then the strength of the magnetic field of the antenna coil 21 detected by the magnetic sensor 24 as calculated by adding together the two output signals of the magnetic sensors 24a and 24b becomes substantially zero. Thus, it will be less likely that a signal indicating the strength of the magnetic field of the antenna coil 21 is included in the output signal of the magnetic sensor 24. Accordingly, the magnetic sensor 24 will function mainly as a sensor for detecting the strength of the magnetic field of the antenna coil 11 while the antenna coil 11 and the antenna coil 21 are moved close together. In other words, in the output signals of the magnetic sensors 24a and 24b, the signal components indicative of the strength of the magnetic field of the antenna coil 21 are cancelled out with respect to each other, while the signal components indicative of the strength of the magnetic field of the antenna coil 11 can be solely detected.

Figure 8:
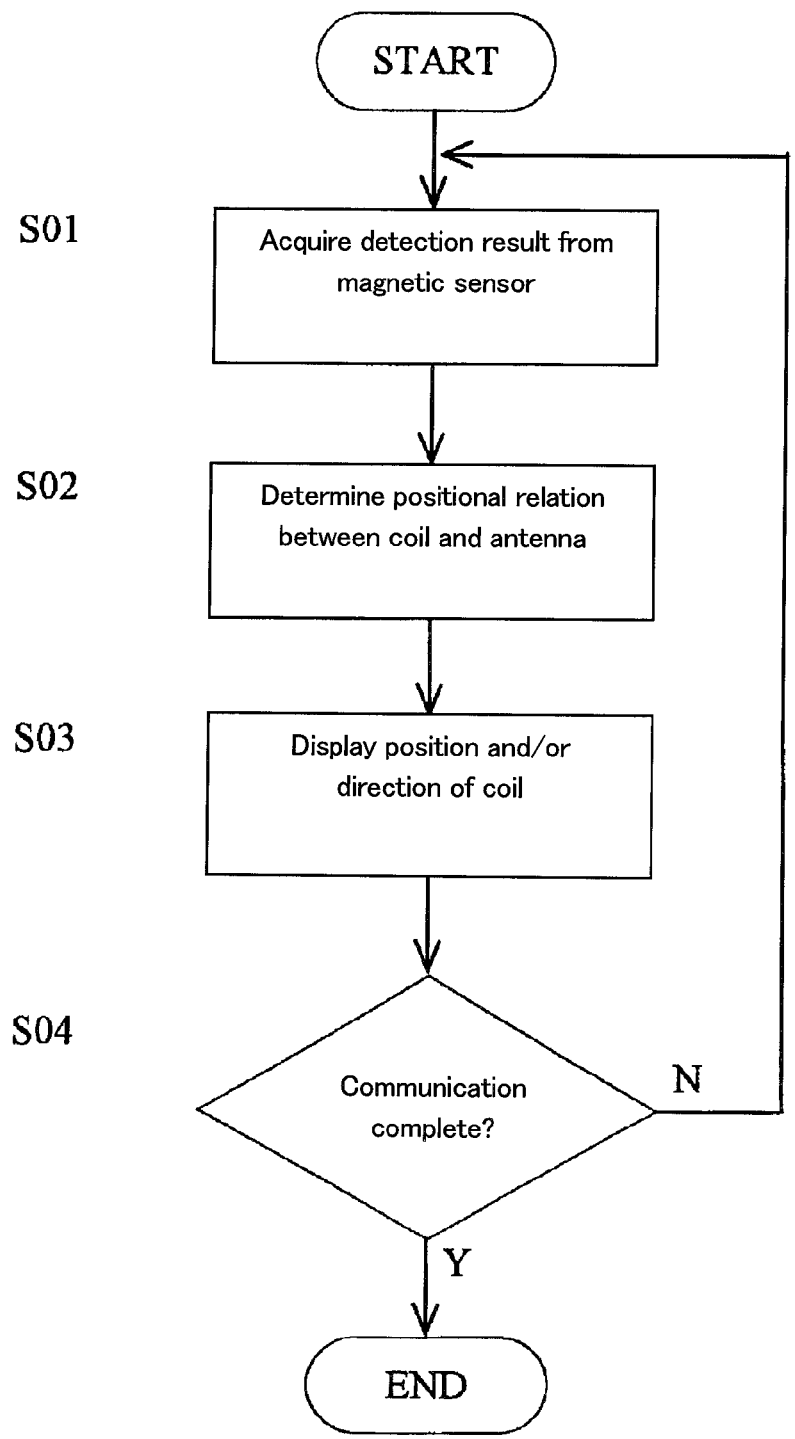
FIG. 8 is a flowchart of a processing executed by a controller of the RF reader.

The processing executed by the controller 26 of the RF reader 2 will now be described. FIG. 8 is a flowchart of an example of the processing executed by the controller 26 of the RF reader 2 in this embodiment.

The controller 26 starts the processing for performing a display that indicates the position and/or direction of the RF tag 1 when communication commences between the antenna coil 11 and the antenna coil 21. In step S01, the controller 26 acquires the output signal of the magnetic sensor 24 from the detector 23. As discussed above, it is less likely that a signal indicating the strength of the magnetic field of the antenna coil 21 is included in the output signal of the magnetic sensor 24. Thus, the output signal of the magnetic sensor 24 mainly includes a signal indicating the strength of the magnetic field of the antenna coil 11.

In step S02, the controller 26 determines the positional relation between the antenna coil 11 and the antenna coil 21. As shown in FIG. 6, in the illustrated embodiment, the RF reader 2 includes a single magnetic sensor 24 (i.e., a single pair of the magnetic sensors 24a and 24b). In this case, the output signal of the magnetic sensor 24 is compared to a specific threshold to determine how near or far the antenna coil 21 is to or from the antenna coil 11.

Figure 9:
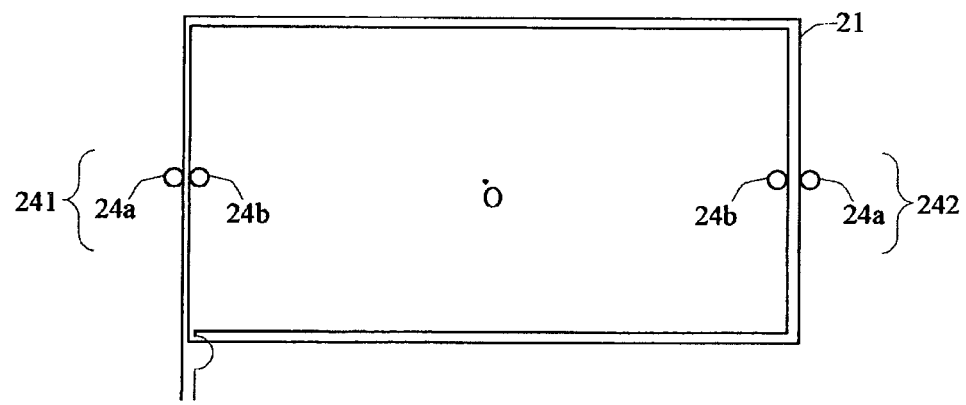
FIG. 9 is a plan view of a first layout example of magnetic sensors.

On the other hand, as shown in FIG. 9, if the RF reader 2 includes two magnetic sensors 24 (e.g., magnetic sensors 241 and 242), then the output signals of one magnetic sensor 24 (e.g., the magnetic sensor 241) and the other magnetic sensor 24 (e.g., the magnetic sensor 242) are compared to determine the one-dimensional direction of the antenna coil 11. Specifically, in this embodiment, the antenna coil 21 is disposed in an area in the lower middle part of the RF reader 2. Thus, there is rarely positional offset in the up and down direction (the Y direction in FIG. 4), while there is often positional offset in the left and right direction (the X direction in FIG. 4). In view of this, as shown in FIG. 9, the magnetic sensors 24 are disposed on two sides of the antenna coil 21 extending in the up and down direction.

With this configuration, if the strength of the magnetic field is higher with the output signal of the magnetic sensor 242 than with the output signal of the magnetic sensor 241, for example, then it is determined that the antenna coil 11 of the RF tag 1 is present in the direction towards the magnetic sensor 242 with respect to the center point O of the antenna coil 21 as the center. The layout of the two magnetic sensors 24 can be varied according to the position of the antenna coil 21 in the RF reader 2. For example, when the antenna coil 21 is disposed in an area in the left middle part of the RF reader 2, it is believed that positional offset will frequently occur in the up and down direction. In view of this, the magnetic sensors 24 can be disposed on two sides of the antenna coil 21 extending in the left and right direction.

Figure 10:
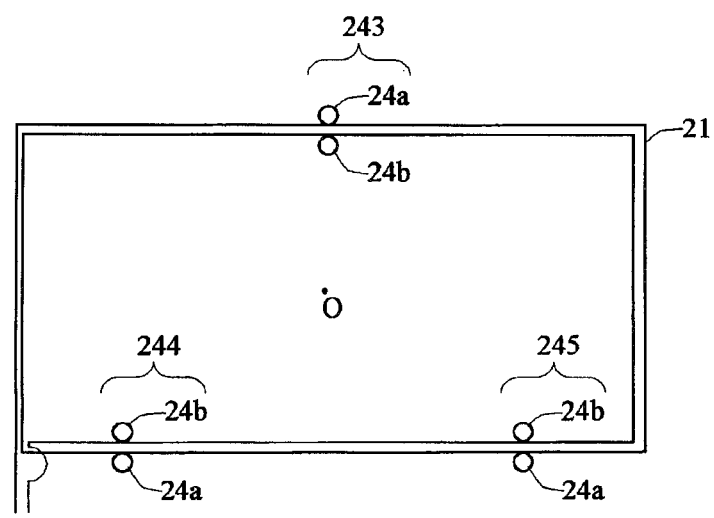
FIG. 10 is a plan view of a second layout example of magnetic sensors.

Furthermore, as shown in FIG. 10, if the RF reader 2 includes three magnetic sensors 24 (e.g., magnetic sensors 243, 244, and 245), or more than three magnetic sensors 24, then the two-dimensional directions of the antenna coil 11 are determined by comparing the output signals of the magnetic sensors 24.

As shown in FIG. 10, in the illustrated embodiment, a total of three magnetic sensors 24 are disposed on two sides (two straight parts) of the antenna coil 21 extending in the left and right direction. One magnetic sensor 24 (e.g., the magnetic sensor 243) is disposed on one side, while two magnetic sensors 24 (e.g., the magnetic sensors 244 and 245) is disposed on the other side. Positional offset in the up and down direction with respect to the RF tag 1 is determined by comparing the output signal of the magnetic sensor 243 with the output signal of the magnetic sensors 244 and/or 245. Also, positional offset of the antenna coil 21 in the left and right direction with respect to the antenna coil 11 is determined by comparing the output signals of the magnetic sensor 244 and the magnetic sensor 245.

Figure 11:
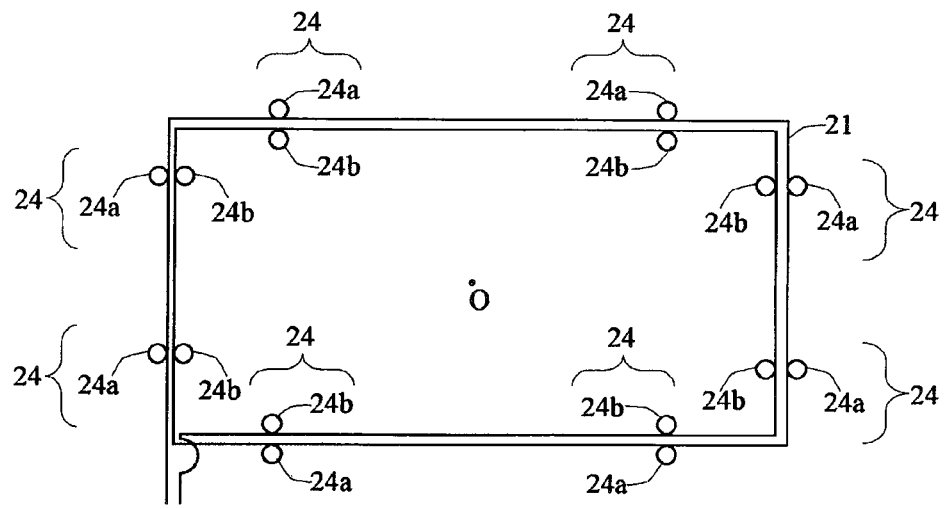
FIG. 11 is a plan view of a third layout example of magnetic sensors.

The controller 26 determines positional offset in two-dimensional directions based on the positional offset in the up and down direction and in the left and right direction thus determined. There are no particular restrictions on the number of magnetic sensors 24. However, the position and/or direction of the RF tag 1 can be determined more accurately by disposing more magnetic sensors 24. For example, as shown in FIG. 11, the positional offset in the up and down direction or in the left and right direction with respect to the RF tag 1 can be determined for each side by disposing two magnetic sensors 24 on each side of the antenna coil 21.

Figure 12:
FIG. 12 is a schematic diagram of a first display example on a display component of the RF reader.
Figure 13:
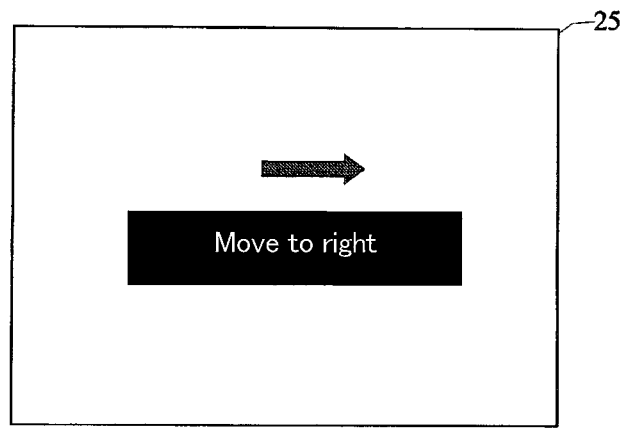
FIG. 13 is a schematic diagram of a second display example on the display component.
Figure 14:
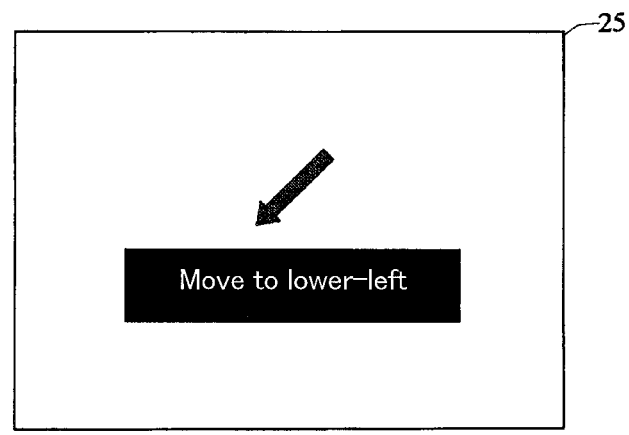
FIG. 14 is a schematic diagram of a third display example on the display component.

In step S03, the controller 26 displays the position and/or direction of the antenna coil 11 on the display component 25 based on the positional relation between the antenna coil 11 and the antenna coil 21 determined in step S02. For example, if the layout of the magnetic sensor 24 is as shown in FIG. 6, then a display indicating how near or far the antenna coil 21 is to or from the antenna coil 11 is given as shown in FIG. 12. If the layout of the magnetic sensors 24 is as shown in FIG. 9, then a display indicating the one-dimensional direction of the antenna coil 11 with respect to the center point O of the antenna coil 21 as a reference is given as shown in FIG. 13. If the layout of the magnetic sensors 24 is as shown in FIGS. 10 and 11, then a display indicating the two-dimensional directions of the antenna coil 11 with respect to the center point O of the antenna coil 21 as a reference is given as shown in FIG. 14.

Figure 15:
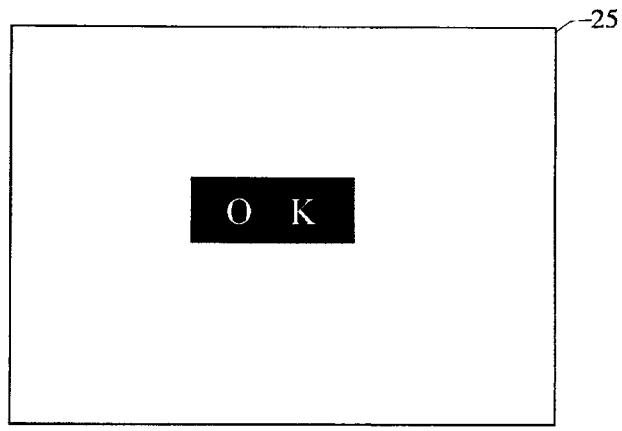
FIG. 15 is a schematic diagram of a fourth display example on the display component.

In the layout of the magnetic sensor 24 shown in FIG. 6, when the difference between the output signal of the magnetic sensor 24 and the specific threshold is at or below a specific value, no positional offset has occurred between the antenna coil 11 and the antenna coil 21, or if it has occurred, it is so minor that it can be ignored. Also, when the difference between the output signals of the magnetic sensors 24 in the layout of the magnetic sensors 24 shown in FIGS. 9 to 11 is at or below a specific value, no positional offset has occurred between the antenna coil 11 and the antenna coil 21, or if it has occurred, it is so minor that it can be ignored. In this case, the controller 26 does not need to display anything on the display component 25, or can give a display indicating that no positional offset has occurred, as shown in FIG. 15, for example.

In step S04, the controller 26 determines whether or not communication has ended between the antenna coil 11 and the antenna coil 21. If communication has not ended (No in step S04), then the flow returns to step S01. With this configuration, if the RF reader 2 is moved, then the display indicating the position and/or direction of the antenna coil 11 is updated. If communication has ended (Yes in step S04), then the processing is concluded.

Alternatively or additionally, when communication between the antenna coil 11 and the antenna coil 21 has not yet ended, it can be determined in step S03 whether or not a specific length of time has elapsed since the display indicating the position and/or direction of the antenna coil 11 was given. If this length of time has elapsed, then the flow returns to step S01. With this configuration, the display is refreshed at regular time intervals.

In the illustrated embodiment, the RF reader (e.g., the communication device) includes the magnetic sensor (e.g., the sensor), the antenna coil (e.g., the sensor), and the controller (e.g., the notification component or notification means). The magnetic sensor detects the strength of the magnetic field (e.g., the magnetic field strength). The antenna coil generates a magnetic field. The antenna coil communicates with the RF tag (e.g., the wireless device) that generates a magnetic field during communication. The controller makes a notification related to positional offset between the antenna coil and the RF tag based on output signal from the magnetic sensor. In other words, the controller notifies a positional offset between the antenna coil and the RF tag based on the output signal indicative of the magnetic field strength.

The magnetic sensor is disposed at a position where it is less likely that a signal indicating the strength of the magnetic field generated from the antenna coil of the RF reader when current flows to the antenna coil of the RF reader will be included in the output signal of the magnetic sensor. In other words, the magnetic sensor is arranged with respect to the antenna coil such that an effect of the magnetic field generated by the antenna coil on the output signal is suppressed.

Thus, the output signal of the magnetic sensor mainly includes a signal indicating the strength of the magnetic field generated from the RF tag that communicates with the RF reader. Therefore, the position and/or direction of the RF tag can be accurately detected based on the output signal of the magnetic sensor. Also, the notification can be given related to the positional offset between the antenna coil of the RF tag and the antenna coil of the RF reader.

In the illustrated embodiment, the magnetic field generated from the antenna coil has a first region and a second region with mutually opposite orientations of the magnetic flux. The magnetic sensor is disposed at a position where the strength of the magnetic field of the first region and the strength of the magnetic field of the second region can be detected. In other words, the magnetic sensor is arranged with respect to the antenna coil such that the magnetic sensor is configured to detect the magnetic field strength in first and second regions, respectively. The magnetic field generated by the antenna has mutually opposite magnetic flux orientations in the first and second regions, respectively.

In the illustrated embodiment, the detected strength of the magnetic field of the first region and the strength of the magnetic field of the second region are added together. This makes it less likely that a signal indicating the strength of the magnetic field generated from the antenna coil of the RF reader will be included in the output signal of the magnetic sensor. In other words, the magnetic sensor is arranged with respect to the antenna coil such that the magnetic field strength detected in the first and second regions cancels out with respect to each other. Thus, the position and/or direction of the RF tag can be detected more accurately.

In the illustrated embodiment, the controller calculates the one- or two-dimensional positional offset direction of the antenna coil of the RF tag with respect to the antenna coil of the RF reader based on the output signal of the magnetic sensor, and gives the notification of the direction of the RF tag. In other words, the controller calculates a positional offset direction of the RF tag with respect to the antenna coil of the RF reader based on the output signal. The controller notifies the positional offset direction of the RF tag. Thus, the user can communicate more stably with the RF tag by moving the RF reader based on this notification.

In the illustrated embodiment, the controller gives a notification indicating that there is no positional offset when the positional offset between the antenna coil of the RF tag and the antenna coil of the RF reader is below a specific threshold based on the output signal of the magnetic sensor. In other words, the controller notifies that there is no positional offset while the positional offset between the RF tag and the antenna coil of the RF reader is below a specific threshold based on the output signal. Thus, the user can communicate more stably with the RF tag by maintaining the current position of the RF reader.

Second Embodiment

Referring now to FIGS. 16 to 25, an RFID system in accordance with a second embodiment will now be explained. In view of the similarity between the first and second embodiments, the parts of the second embodiment that are functionally identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, a magnetic resistance element is used as the magnetic sensor 24. In the second embodiment, a less expensive pickup coil is used as the magnetic sensor 24. This pickup coil include a circular pickup coil (or loop coil), and a figure-eight pickup coil.

Figure 16:
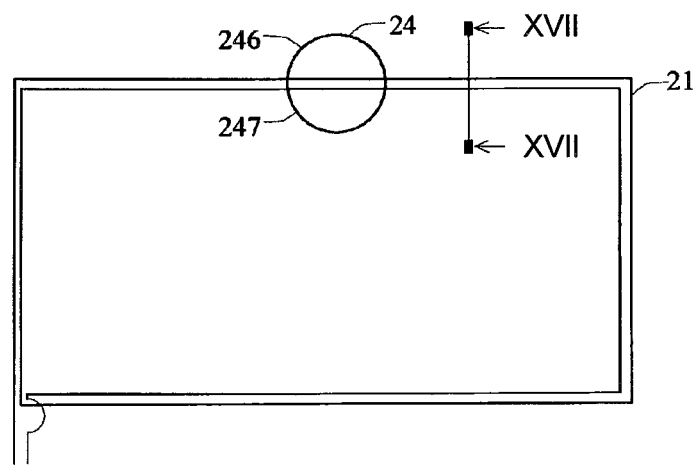
FIG. 16 is a plan view of a second example of the internal configuration of an RF reader in accordance with a second embodiment.
Figure 17:
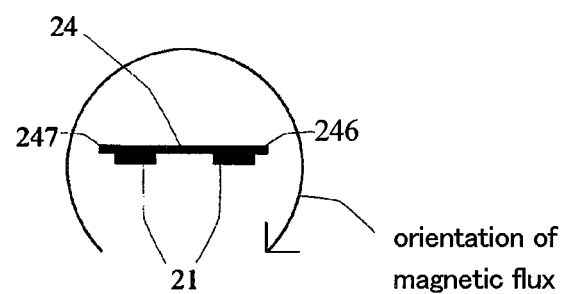
FIG. 17 is a cross sectional view of the RF reader, taken along XVII-XVII line in FIG. 16.
Figure 18:
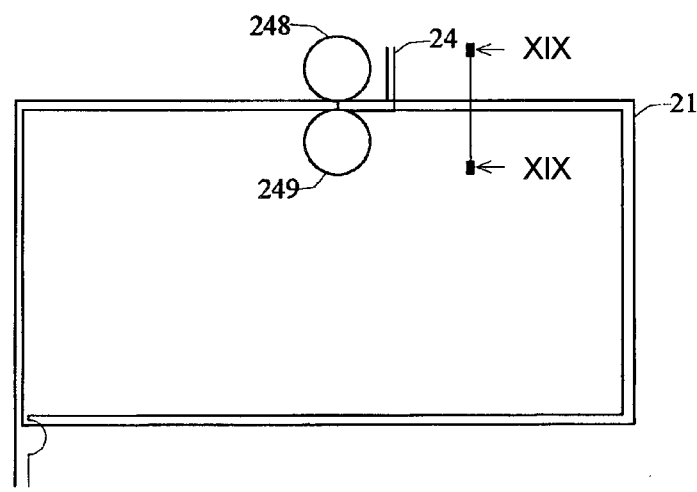
FIG. 18 is a plan view of a third example of the internal configuration of an RF reader in accordance with a second embodiment.
Figure 19:
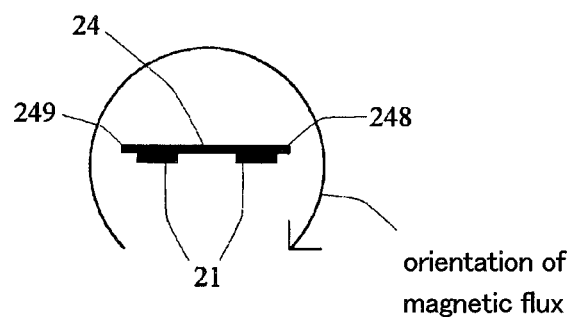
FIG. 19 is a cross sectional view of the RF reader, taken along XIX-XIX line in FIG. 18.

FIG. 16 is a plan view of a second example of the internal configuration of the RF reader 2. FIG. 17 is a lateral cross section along XVII-XVII line in FIG. 16. FIG. 18 is a plan view of a third example of the internal configuration of the RF reader 2. FIG. 19 is a lateral cross section along XIX-XIX line in FIG. 18. In the illustrated embodiment, as shown in FIGS. 16 and 17, the RF reader 2 includes a circular pickup coil as the magnetic sensor 24. Alternatively, as shown in FIGS. 18 and 19, the RF reader 2 can include a figure-eight pickup coil as the magnetic sensor 24. The magnetic sensor 24 is also called the pickup coil 24 below.

As shown in FIGS. 16 and 17, as viewed in a direction perpendicular to the paper plane in FIG. 16, the magnetic field generated from the antenna coil 21 is separated into a magnetic field generated in the first region outside of the antenna coil 21 (e.g., a first magnetic field) and a magnetic field generated in the second region inside of the antenna coil 21 (e.g., a second magnetic field). The orientations of the magnetic flux of these magnetic fields are mutually opposite, as shown in FIG. 17. The circular pickup coil 24 includes first and second sensor components 246 and 247. The first sensor component 246 detects the strength of the magnetic field of part of the first region, while the second sensor component 247 detects the strength of the magnetic field of part of the second region. The detector 23 obtains the strength of the magnetic field by adding together the strength of the magnetic field of the antenna coil 21 detected by the first sensor component 246 and the strength of the magnetic field of the antenna coil 21 detected by the second sensor component 247. The detector 23 further outputs the obtained strength of the magnetic field to the controller 26 as the strength of the magnetic field of the antenna coil 21 detected by the pickup coil 24.

As shown in FIG. 16, the first sensor component 246 and the second sensor component 247 are respectively disposed so as to detect the strength of the magnetic field of part of the first region and part of the second region, respectively. Furthermore, as shown in FIG. 17, the orientation of the magnetic flux detected by the first sensor component 246 and the orientation of the magnetic flux detected by the second sensor component 247 are substantially opposite directions. Therefore, if the absolute values of the strength of the magnetic field of the antenna coil 21 detected by the first sensor component 246 and the second sensor component 247 are substantially the same, then the strength of the magnetic field of the antenna coil 21 detected by the pickup coil 24 as calculated by adding together the two output signals will be substantially zero. That is, it will be less likely that a signal indicating the strength of the magnetic field of the antenna coil 21 will be included in the output signal of the pickup coil 24. Thus, the pickup coil 24 will function mainly as a sensor for detecting the strength of the magnetic field of the antenna coil 11 when the antenna coil 11 and the antenna coil 21 are moved close together.

Similarly, as shown in FIGS. 18 and 19, the figure-eight-shaped pickup coil 24 includes a first coil 248 and a second coil 249. The first coil 248 and the second coil 249 are respectively disposed at a position where the strength of part of the magnetic field outside of the antenna coil 21 (e.g., the first region) is detected, and a position where the strength of part of the magnetic field inside of the antenna coil 21 (e.g., the second region) is detected. The detector 23 obtains the strength of the magnetic field by adding together the strength of the magnetic field of the antenna coil 21 detected by the first coil 248 and the strength of the magnetic field of the antenna coil 21 detected by the second coil 249. The detector 23 outputs the strength of the magnetic field to the controller 26 as the strength of the magnetic field of the antenna coil 21 detected by the pickup coil 24.

As shown in FIG. 19, the first coil 248 and the second coil 249 are disposed so as to detect the strength of the magnetic field in the first region and the second region, respectively. The orientation of the magnetic flux detected by the first coil 248 and the orientation of the magnetic flux detected by the second coil 249 are substantially opposite directions. Therefore, if the absolute values of the strength of the magnetic field of the antenna coil 21 detected by the first coil 248 and the second coil 249 are substantially the same, then the strength of the magnetic field of the antenna coil 21 detected by the pickup coil 24 as calculated by adding together the two output signals will be substantially zero. That is, it will be less likely that a signal indicating the strength of the magnetic field of the antenna coil 21 will be included in the output signal of the pickup coil 24. Thus, the pickup coil 24 will function mainly as a sensor for detecting the strength of the magnetic field of the antenna coil 11 when the antenna coil 11 and the antenna coil 21 are moved close together.

This embodiment provides the same effect as the first embodiment. In addition, an inexpensive pickup coil can be used as the magnetic sensor. Thus, the cost of the RF reader can be decreased.

In the above-mentioned embodiments, the controller 26 gives a display on the display component 25 indicating the position and/or direction of the antenna coil 11 to notify the user about the position and/or direction of the antenna coil 11. In other words, the controller 26 is an example of the notification component (or notification means) of the present invention. However, the position and/or direction of the antenna coil 11 can instead be conveyed to the user by some method other than a display. For instance, the position and/or direction of the antenna coil 11 can be conveyed by sound emitted from a speaker. Specifically, as long as the position and/or direction of the antenna coil 11 can be recognized, any notification method can be employed.

In the above embodiments, when the RF reader 2 includes two magnetic sensors 24, the one-dimensional direction of the antenna coil 11 is determined. However, two-dimensional directions can be determined when the RF reader 2 further has an acceleration sensor that detects the movement direction of the RF reader 2.

Figure 20:
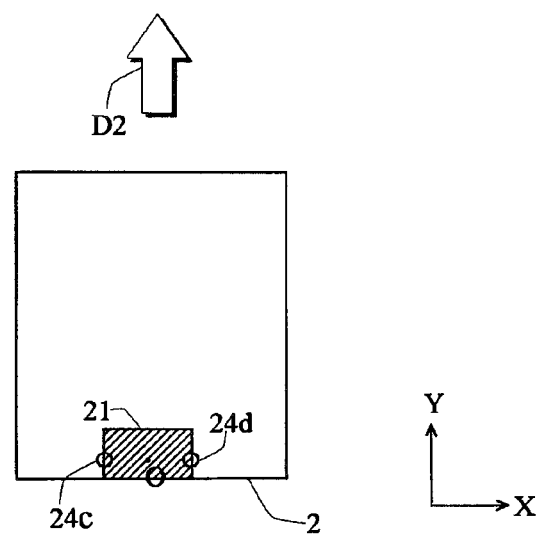
FIG. 20 is a plan view of a modification example of an RF reader.

This will be described in detail through reference to FIG. 20. FIG. 20 is a diagram illustrating a modification example of the RF reader 2. The RF reader 2 has pickup coils 24c and 24d as the magnetic sensors 24. With this configuration, if the strength of the magnetic field of the output signal of the pickup coil 24d is higher than that of the output signal of the pickup coil 24c, then it is determined that the antenna coil 11 is present in the direction towards the pickup coil 24d (right direction) with respect to the center point O of the antenna coil 21 as a reference. In addition, fluctuation in the strength of the magnetic field detected by the pickup coils 24c and 24d can also be utilized. For example, if the strength of the magnetic field detected by the pickup coils 24c and 24d weakens while the RF reader 2 is moved in the direction of the arrow D1, then it can be determined that the RF tag 1 is present in the upward direction. That is, the antenna coil 11 is determined to be present in the right direction and the upward direction (that is, the upper-right direction) from the RF reader 2.

Meanwhile, if the strength of the magnetic field detected by the pickup coils 24c and 24d weakens while the RF reader 2 is moved in the direction of the arrow D2, then it can be determined that the antenna coil 11 is present in the downward direction. That is, the RF tag 1 is determined to be present in the right direction and the downward direction (that is, the lower-right direction) from the RF reader 2.

In the above embodiments, the output signal of one magnetic sensor 24 is compared with a threshold, or the output signals of two or more magnetic sensors 24 are compared with respect to each other. Then, the one-dimensional direction or two-dimensional directions of the antenna coil 11 are indicated. However, alternatively, the centroid coordinates P of the magnetic field generated from the antenna coil 11 can be calculated, and the direction of the centroid coordinates P relative to the center point O of the antenna coil 21 as a reference can be determined as the direction of the antenna coil 11.

When the positional coordinates of an i-th magnetic sensor 24 are $(X_i, Y_i)$, and the output signal of this magnetic sensor 24 is Hi (A/m), then the centroid coordinates P (X, Y) of the magnetic field generated from the antenna coil 11 satisfy the following equations (1) and (2).

$$\Sigma(X_i-X)Hi=0 \quad (1)$$

$$\Sigma(Y_i-Y)Hi=0 \quad (2)$$

Figure 21:
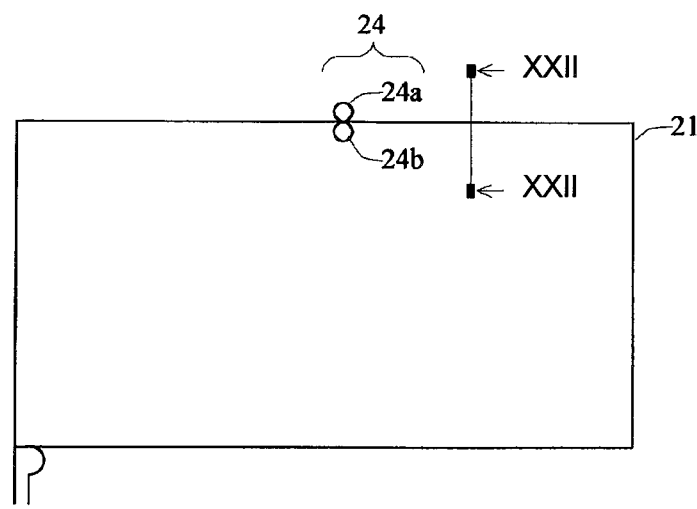
FIG. 21 is a plan view of a first modification example of an antenna coil.
Figure 22:
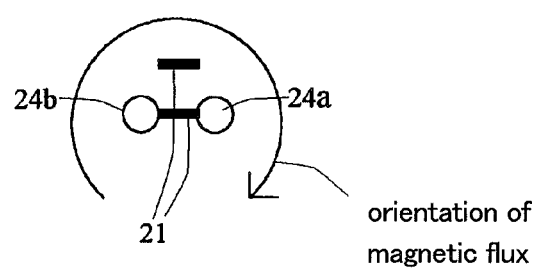
FIG. 22 is a cross sectional view of the RF reader, taken along XXII-XXII line in FIG. 21.

In the above embodiments, a loop antenna wound in a flat spiral is used as the antenna coil 21. However, this is not the only option. For example, a loop antenna with a three-dimensional spiral shape can be used as shown in FIGS. 21 and 22. In other words, in this example, the spiral shape extends in an axial direction of the antenna coil 21. FIGS. 21 and 22 are modification examples of the antenna coil 21 shown in FIGS. 6 and 7, respectively. However, this loop antenna can be applied to the antenna coil 21 in other embodiments.

Here, the strength of the magnetic field of the antenna coil 21 generated in the first region, and the strength of the magnetic field of the antenna coil 21 generated in the second region will be further described. In the above embodiments, the strength of the magnetic field generated in the second region of the antenna coil 21 is affected by the magnetic field generated from all parts (the four sides) of the antenna coil 21, while the strength of the magnetic field generated in the first region is mainly affected by the magnetic field generated from just one part (one side) of the antenna coil 21. Therefore, the strength of the magnetic field in the second region is generally higher than the strength of the magnetic field in the first region.

Figure 23:
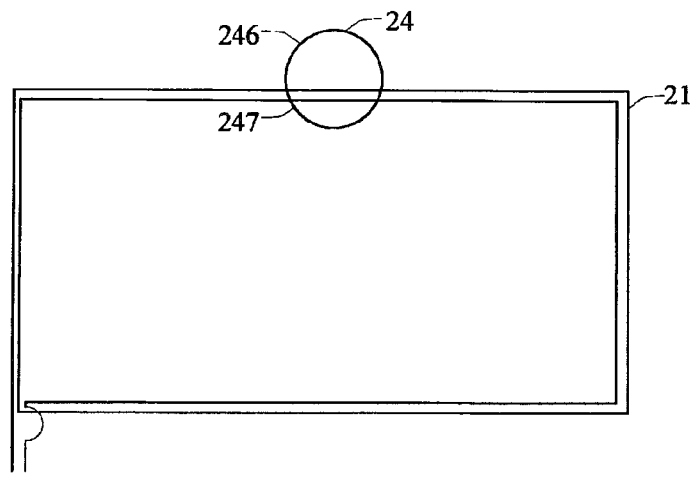
FIG. 23 is a plan view of a second modification example of an antenna coil.
Figure 24:
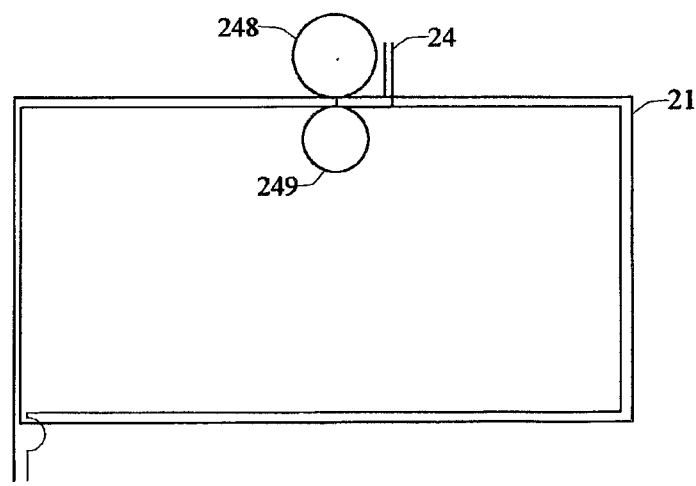
FIG. 24 is a plan view of a third modification example of an antenna coil.

As shown in FIGS. 23 and 24, when the magnetic sensors 24 are pickup coils, the sensors that detect the strength of the magnetic field in the second region of the magnetic sensors 24 (the second sensor component 247 and the second coil 249) can be made smaller than the sensors that detect the strength of the magnetic field in the first region (the first sensor component 246 and the first coil 248). This makes the sum of the strength of the magnetic field of the antenna coil 21 detected by the magnetic sensor 24 substantially zero.

Figure 25:
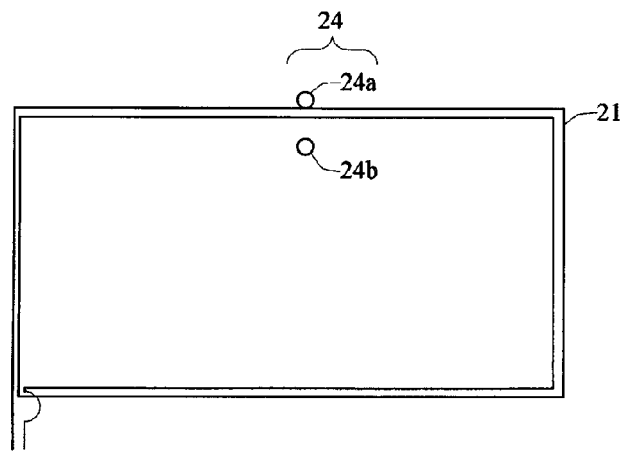
FIG. 25 is a plan view of a fourth modification example of an antenna coil.

Also, when the magnetic sensor 24 is a magnetic resistance element as shown in FIGS. 6 and 7, the position at which the magnetic sensor 24a detects the strength of the magnetic field in the first region can be set closer than the position at which the magnetic sensor 24b detects the strength of the magnetic field in the second region with respect to the part of the antenna coil 21 that generates the magnetic field detected by the magnetic sensors 24a and 24b, as shown in FIG. 25.

That is, when the strength of the magnetic field of the first region and the strength of the magnetic field of the second region are different, the magnetic sensor 24 is disposed such that the detection of the strength of the magnetic field in the region with the stronger magnetic field will be suppressed more than the detection of the strength of the magnetic field in the region with the weaker magnetic field. In other words, the magnetic field generated by the antenna coil has a larger strength in the second region than in the first region. The magnetic sensor is arranged with respect to the antenna coil such that detection of the magnetic field strength in the second region is suppressed more than detection of the magnetic field strength in the first region.

Also, alternatively, the strength of the magnetic field of the antenna coil 21 detected by the magnetic sensor 24 can be set to substantially zero by adjusting the gain of the output signal of the magnetic field in the first region and/or the output signal of the magnetic field in the second region.

Third Embodiment

Referring now to FIGS. 26 to 39, a non-contact power feed system 300 is illustrated that is equipped with a feeder device 400 and a receiver device 500 in accordance with a third embodiment will now be explained. In view of the similarity between the first and second embodiments and the third embodiment, the parts of the third embodiment that are functionally identical to the parts of the first and second embodiments will be given the same reference numerals or names as the parts of the first and second embodiments. Moreover, the descriptions of the parts of the third embodiment that are identical to the parts of the first and second embodiments may be omitted for the sake of brevity.

In the first and second embodiments above, the user is notified of the direction of the RF tag 1 when the positional offset occurred between the RF tag 1 and the RF reader 2 in the RFID system. This notification can also be applied to when the positional offset has occurred between a receiver element 510 of the receiver device 500 and a feeder element 440 of the feeder device 400 in the non-contact power feed system 300.

Figure 26:
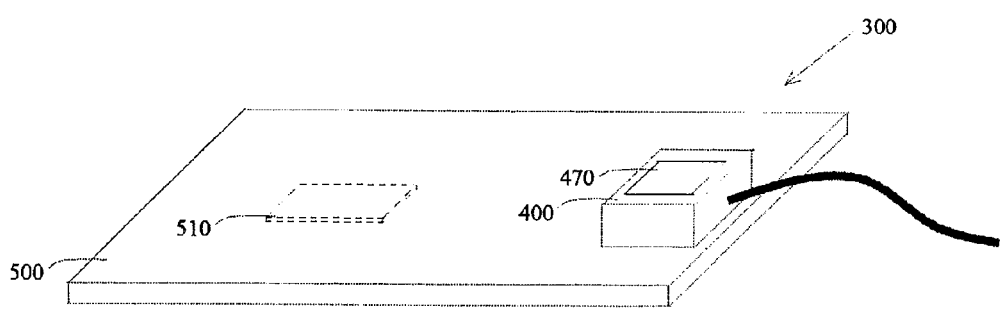
FIG. 26 is a schematic diagram of a first example of a non-contact power feed system in accordance with a third embodiment.
Figure 27:
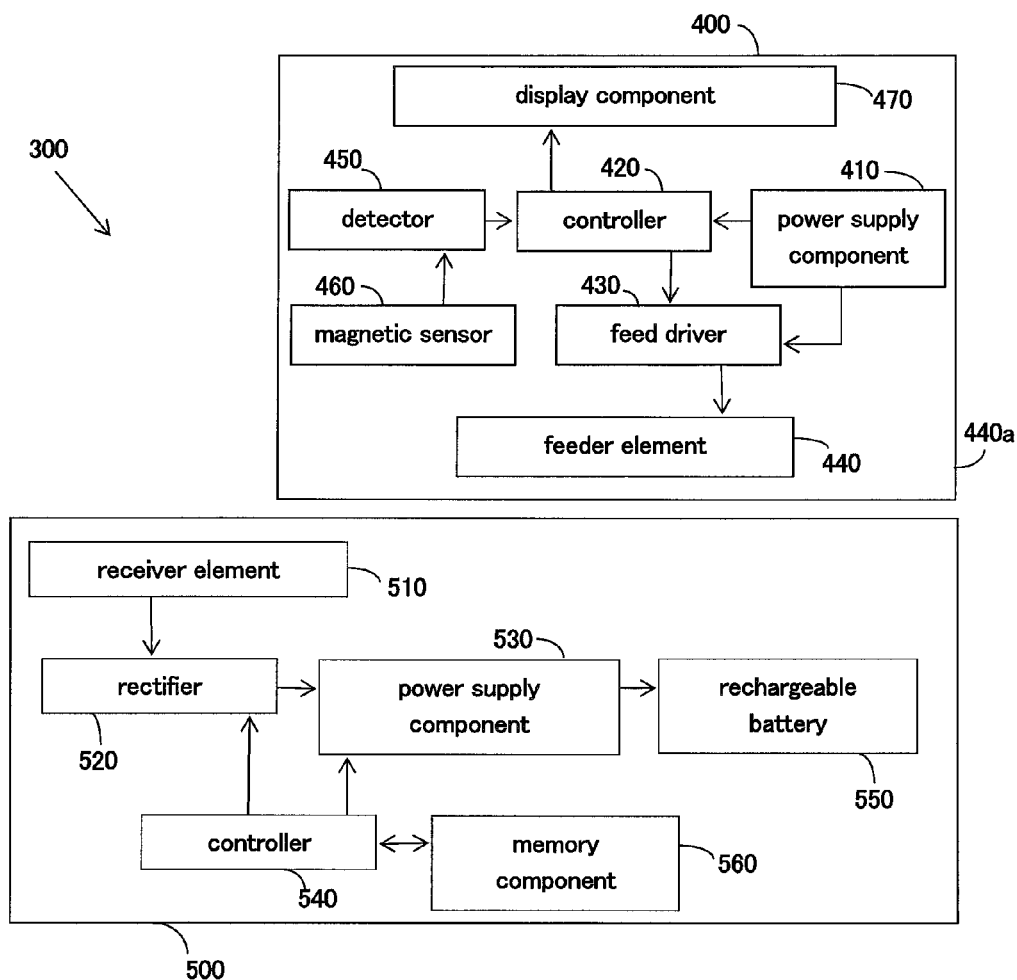
FIG. 27 is a block diagram of the configurations of a receiver device and a feeder device of the non-contact power feed system.

Referring now to FIGS. 26 and 27, the non-contact power feed system 300 will be described in detail. FIG. 26 is a simplified diagram of a first example of the non-contact power feed system 300. FIG. 27 is a diagram of the configuration of the non-contact power feed system 300. In the third and fourth embodiments, the feeder device 400 and the receiver device 500 of the non-contact power feed system 300 are illustrated as examples of the feeder device and the receiver device of the present invention in order to give specific embodiments of the technological concept of the present invention. However, the present invention is not limited to this feeder device and receiver device, and can be equally applied to the feeder device and receiver device in other embodiments encompassed by claims.

As shown in FIG. 26, the non-contact power feed system 300 includes the feeder device 400 and the receiver device 500. In FIG. 26, the receiver element 510 is disposed in an area (the lower middle part in FIG. 26) of the rear face of the receiver device 500, such as a smart phone or a tablet terminal. The user can perform non-contact power feed by moving the feeder element 440 of the feeder device 400 closer to the receiver element 510 of the receiver device 500.

As shown in FIG. 26, the receiver device 500 is larger than the feeder device 400. Thus, to perform the non-contact power feed, the user has to move the feeder device 400 (i.e., the feeder element 440 of the feeder device 400) by hand to the position of the receiver element 510 of the receiver device 500. In view of this, in this embodiment, the user is notified of the location of the receiver element 510 via a display component 470 of the feeder device 400.

As shown in FIG. 27, the feeder device 400 includes a power supply component 410, a controller 420, a feed driver 430, a feeder element 440, a detector 450, a magnetic sensor 460, and the display component 470. The power supply component 410 is supplied with AC power from a commercial power supply (not shown). The power supply component 410 supplies power to the controller 420 and the feed driver 430.

The controller 420 is a control means or processor for controlling the entire feeder device 400. The feed driver 430 supplies AC power to the feeder element 440.

When AC power is supplied to the feeder element 440, AC current flows to the feeder element 440. This produces an alternating magnetic field in a direction perpendicular to a power feed face 440*a*. This alternating magnetic field excites the inductive current at the receiver element 510 located near the feeder element 440, and causes power to be transmitted.

In the third and fourth embodiments, there are no particular restrictions on the material and shape of the feeder element 440. However, a coil module can be used, for example. The coil module has a shape that spirals counter-clockwise toward the center of the spiral in a top view, for example.

The detector 450 inputs the output signal (e.g., the detection result) of the magnetic sensor 460 to the controller 420. The magnetic sensor 460 detects the strength of the magnetic field generated from the receiver element 510. Specifically, the magnetic sensor 460 detects the strength of the magnetic field in the superposition direction of the receiver element 510 and the feeder element 440 (see FIG. 28, discussed below). The magnetic sensor 460 is formed by a pickup coil, a magnetic resistance element (MR element), a Hall element, a magnetic impedance element (MI element), or the like. The feeder device 400 in this embodiment includes one or more magnetic sensors 460. The layout of the magnetic sensor 460 will be discussed in detail below.

The display component 470 displays a specific image or video. Information indicating the direction of the receiver device 500 (i.e., the receiver element 510 of the receiver device 500) is displayed on the display component 470, as discussed below.

As shown in FIG. 27, the receiver device 500 includes the receiver element 510, a rectifier 520, a power supply component 530, a controller 540, a rechargeable battery 550, and a memory component 560. As discussed above, the receiver element 510 receives power transmitted from the feeder element 440. The AC power received by the receiver element 510 is supplied to the rectifier 520. The rectifier 520 is formed by a diode, a capacitor, or the like. The rectifier 520 converts the AC power supplied from the receiver element 510 into DC power.

The power converted into DC by the rectifier 520 is supplied to the power supply component 530. The controller 540 is a control means or processor for controlling the entire receiver device 500. The controller 540 controls the conversion by the rectifier 520 of the AC power received by the receiver element 510 into DC power. The controller 540 also controls the storage of power by the power supply component 530 in the rechargeable battery 550.

The memory component 560 is a memory means for storing various kinds of information. The memory component 560 is formed by an EEPROM, for example. The memory component 560 stores an identification number for the feeder device 400.

Figure 28:
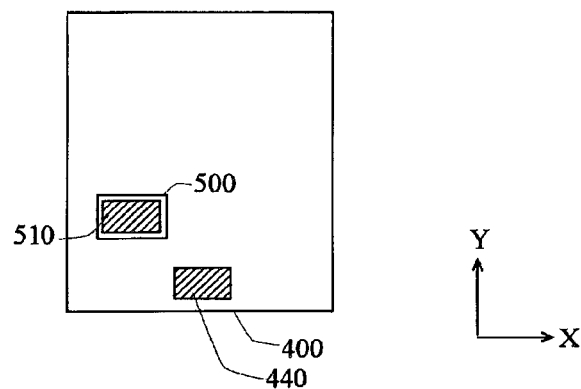
FIG. 28 is a plan view of the receiver device and the feeder device, illustrating that a receiver element of the receiver device and a feeder element of the feeder device are in a state of positional offset.
Figure 29:
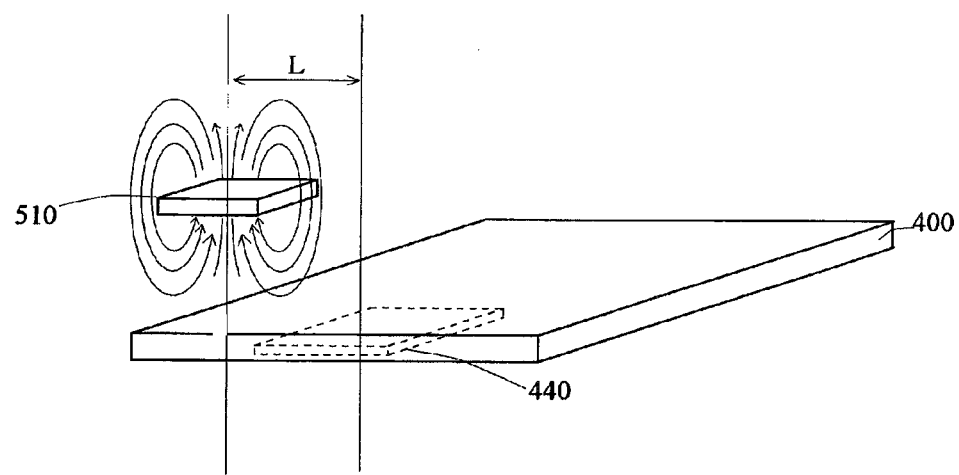
FIG. 29 is a perspective view of the receiver element and the feeder element, illustrating that the receiver element and the feeder element are in a state of positional offset.
Figure 30:
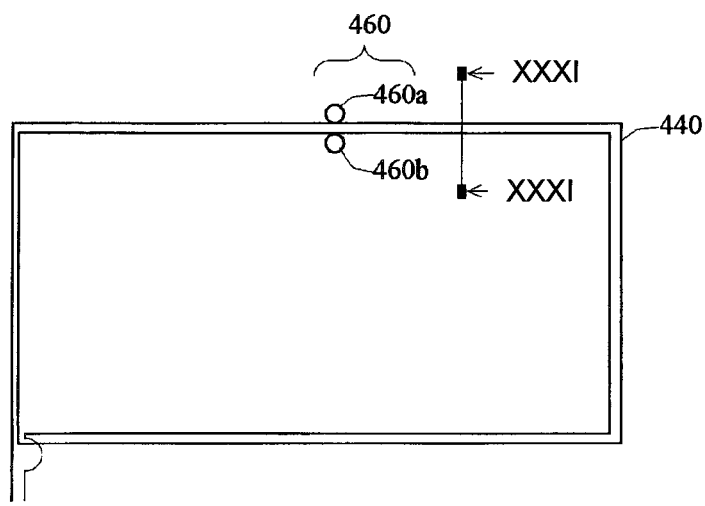
FIG. 30 is a plan view of a first example of the internal configuration of the feeder device.
Figure 31:
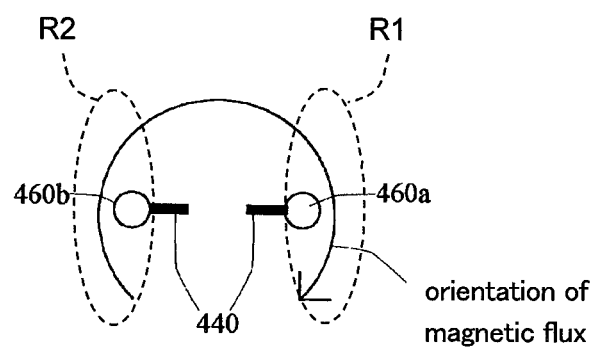
FIG. 31 is a cross sectional view of the feeder device, taken along XXXI-XXXI line in FIG. 30.

Next, the layout of the magnetic sensor 460 in the feeder device 400 will now be described through reference to FIGS. 28 and 29. FIG. 28 is a plan view of when the receiver element 510 and the feeder element 440 are in a state of positional offset. FIG. 29 is an oblique view of when the receiver element 510 and the feeder element 440 are in a state of positional offset. FIG. 30 is a plan view of a first example of the internal configuration of the feeder device 400. FIG. 31 is a lateral cross section along the XXXI-XXXI line in FIG. 30.

When power is fed between the receiver element 510 and the feeder element 440 by a non-contact method, the two must be moved relatively close together, such as about a few centimeters apart. Therefore, even when the feeder element 440 is moved close to the receiver element 510, the feeder element 440 can sometimes be impossible to feed power to the receiver element 510 if there is a large amount of positional offset between the receiver element 510 and the feeder element 440.

The phrase "positional offset between the receiver element 510 and the feeder element 440" refers to a state in which the receiver element 510 is not within the region of the feeder element 440 when projected in the superposition direction of the receiver element 510 and the feeder element 440 (i.e., the direction perpendicular to the paper plane in FIG. 28) while the feeder device 400 is moved close to the receiver element 510, as shown in FIG. 28. More precisely, as shown in FIG. 29, this phrase refers to a state in which the distance between the center axis of the feeder element 440 and the center axis of the receiver element 510 is at least a specific distance L. In the illustrated embodiment, the specific distance L can be the communicable distance, or it can be any distance that is less than the communicable distance.

As shown in FIGS. 28 and 29, if the positional offset has occurred, then power will not be fed properly, such as a decrease in the power feed efficiency related to power feed from the feeder element 440 to the receiver element 510. Therefore, in this embodiment, the controller 420 determines the position and/or direction of the receiver element 510 based on the output signal of the magnetic sensor 460 inputted from the detector 450. Also, the controller 420 displays information indicating the position and/or direction of the receiver element 510 on the display component 470.

As discussed above, the magnetic sensor 460 detects the strength of the magnetic field generated from the receiver element 510. However, the magnetic sensor 460 also detects the strength of the magnetic field generated from the feeder element 440. The strength of the magnetic field generated from the receiver element 510 is weaker than the strength of the magnetic field generated from the feeder element 440, particularly when the receiver element 510 is a passive tag. Thus, it is conceivable that the magnetic sensor 460 will detect mainly the strength of the magnetic field generated from the feeder element 440.

In view of this, in this embodiment, the magnetic sensor 460 is disposed at a position where it is less likely that a signal indicating the strength of the magnetic field generated from the feeder element 440 will be included in the output signal of the magnetic sensor 460. In this embodiment, as shown in FIG. 30, the magnetic sensor 460 only includes two magnetic sensors 460a and 460b (e.g., two magnetic sensor elements). These magnetic sensors 460a and 460b are made of magnetic resistance elements.

As shown in FIG. 31, the magnetic field generated from the feeder element 440 has a first region R1 and a second region R2 with mutually opposite orientations or directions of the magnetic flux. The magnetic sensors 460a and 460b are respectively disposed at positions that allow the detections of the strength of the magnetic field in part of the first region and the strength of the magnetic field in the second region, out of the magnetic field generated from the feeder element 440. This will now be described in detail through reference to FIGS. 30 and 31. In the following description, the fact that the magnetic sensors 460a and 460b detect the strength of the magnetic field in part of the first region and in part of the second region, respectively, will also be stated simply as "detects the strength of the magnetic field in the first region and the second region." In the illustrated embodiment, as shown in FIG. 31, the first region R1 is located outside the feeder element 440, while the second region R2 is located inside the feeder element 440.

As shown in FIG. 30, the magnetic sensors 460a and 460b are respectively disposed at a position where the strength of the magnetic field in part of the first region outside of the feeder element 440 is detected, and a position where the strength of the magnetic field in part of the second region inside of the feeder element 440 is detected. The detector 450 obtains a magnetic field strength by adding the strength of the magnetic field of the feeder element 440 detected by the magnetic sensor 460a to the strength of the magnetic field of the feeder element 440 detected by the magnetic sensor 460b. The detector 450 outputs the magnetic field strength to the controller 420 as the strength of the magnetic field of the feeder element 440 detected by the magnetic sensor 460.

As shown in FIG. 31, if the magnetic sensors 460a and 460b are respectively disposed in the first region and the second region, respectively, with the feeder element 440 in between. Thus, the orientation of the magnetic flux detected by the magnetic sensor 460a will be substantially the opposite of the orientation of the magnetic flux detected by the magnetic sensor 460b. Therefore, if the absolute values of the strength of the magnetic field of the feeder element 440 detected by the magnetic sensors 460a and 460b are substantially the same, then the strength of the magnetic field of the feeder element 440 detected by the magnetic sensor 460 as calculated by adding together the two output signals of the magnetic sensors 460a and 460b becomes substantially zero. Thus, it will be less likely that a signal indicating the strength of the magnetic field of the feeder element 440 is included in the output signal of the magnetic sensor 460. Accordingly, the magnetic sensor 460 will function mainly as a sensor for detecting the strength of the magnetic field of the receiver element 510 while the receiver element 510 and the feeder element 440 are moved close together. In other words, in the output signals of the magnetic sensors 460a and 460b, the signal components indicative of the strength of the magnetic field of the feeder element 440 are cancelled out with respect to each other, while the signal components indicative of the strength of the magnetic field of the receiver element 510 can be solely detected.

Figure 32:
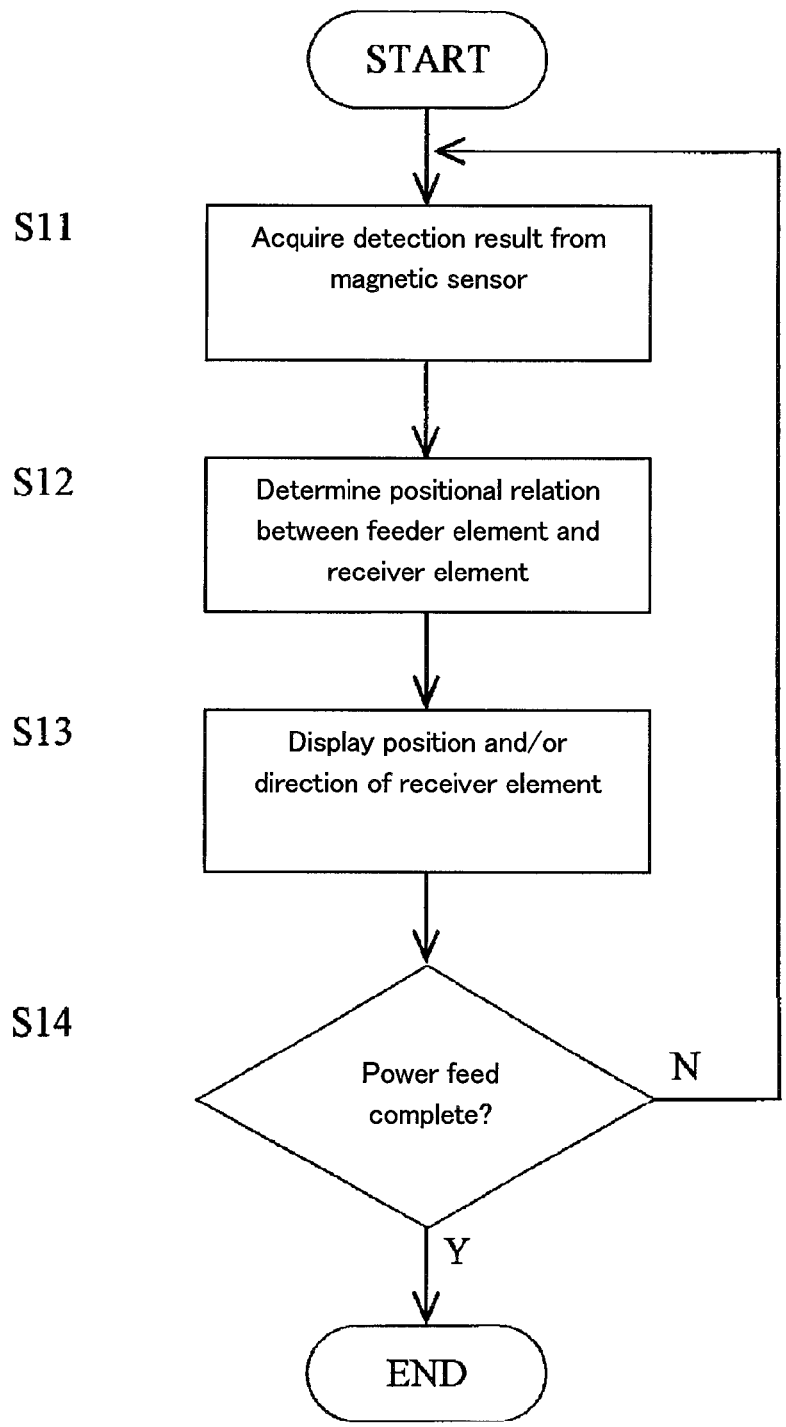
FIG. 32 is a flowchart of a processing executed by a controller of the feeder device.

The processing executed by the controller 420 of the feeder device 400 will now be described. FIG. 32 is a flowchart of an example of the processing executed by the controller 420 of the feeder device 400 in this embodiment.

The controller 420 starts the processing for performing a display that indicates the position and/or direction of the receiver element 510 when communication commences between the receiver element 510 and the feeder element 440. In step S11, the controller 420 acquires the output signal of the magnetic sensor 460 from the detector 450. As discussed above, it is less likely that a signal indicating the strength of the magnetic field of the feeder element 440 is included in the output signal of the magnetic sensor 460. Thus, the output signal of the magnetic sensor 460 mainly includes a signal indicating the strength of the magnetic field of the receiver element 510.

In step S12, the controller 420 determines the positional relation between the receiver element 510 and the feeder element 440. As shown in FIG. 30, in the illustrated embodiment, the feeder device 400 includes a single magnetic sensor 460 (i.e., a single pair of the magnetic sensors 460a and 460b). In this case, the output signal of the magnetic sensor 460 is compared to a specific threshold to determine how near or far the feeder element 440 is to or from the receiver element 510.

Figure 33:
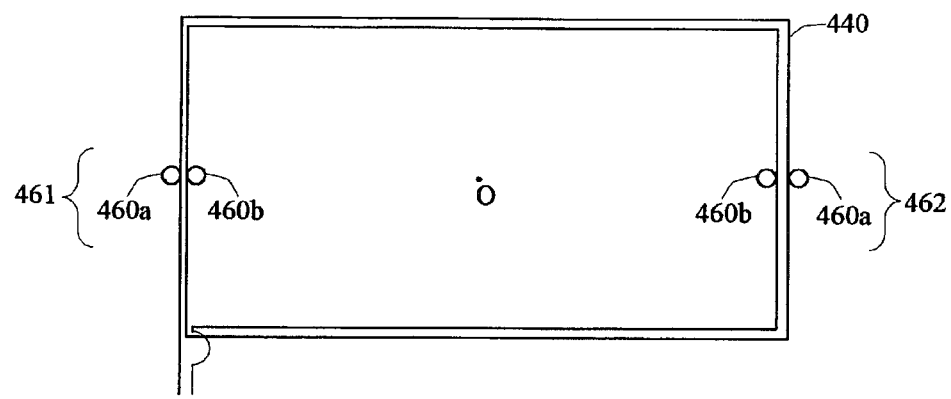
FIG. 33 is a plan view of a fourth layout example of magnetic sensors.

On the other hand, as shown in FIG. 33, if the feeder device 400 includes two magnetic sensors 460 (e.g., magnetic sensors 461 and 462), then the output signals of one magnetic sensor 460 (e.g., the magnetic sensor 461) and the other magnetic sensor 460 (e.g., the magnetic sensor 462) are compared to determine the one-dimensional direction of the receiver element 510. Specifically, in this embodiment, the feeder element 440 is disposed in an area in the lower middle part of the feeder device 400. Thus, there is rarely positional offset in the up and down direction (the Y direction in FIG. 28), while there is often positional offset in the left and right direction (the X direction in FIG. 28). In view of this, as shown in FIG. 33, the magnetic sensors 460 are disposed on two sides of the feeder element 440 extending in the up and down direction.

With this configuration, if the strength of the magnetic field is higher with the output signal of the magnetic sensor 462 than with the output signal of the magnetic sensor 461, for example, then it is determined that the receiver element 510 is present in the direction towards the magnetic sensor 462 with respect to the center point O of the feeder element 440 as the center. The layout of the two magnetic sensors 460 can be varied according to the position of the feeder element 440 in the feeder device 400. For example, when the feeder element 440 is disposed in an area in the left middle part of the feeder device 400, it is believed that positional offset will frequently occur in the up and down direction. In view of this, the magnetic sensors 460 can be disposed on two sides of the feeder element 440 extending in the left and right direction.

Figure 34:
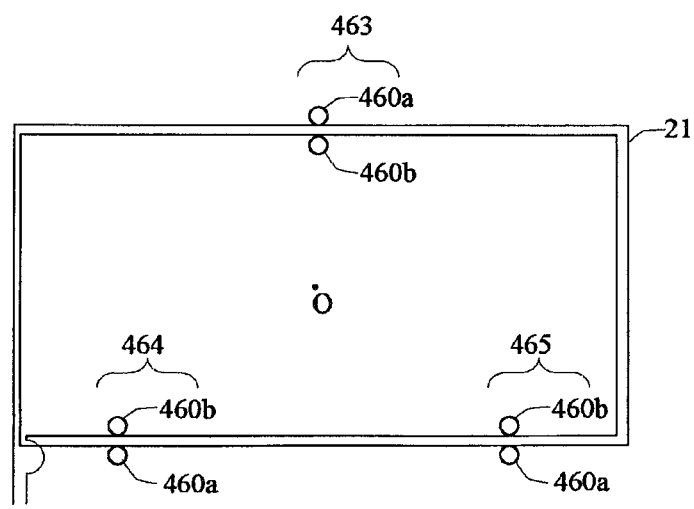
FIG. 34 is a plan view of a fifth layout example of magnetic sensors.

Furthermore, as shown in FIG. 34, if the feeder device 400 includes three magnetic sensors 460 (e.g., magnetic sensors 463, 464, and 465), or more than three magnetic sensors 460, then the two-dimensional directions of the receiver element 510 are determined by comparing the output signals of the various magnetic sensors 460.

As shown in FIG. 34, in the illustrated embodiment, a total of three magnetic sensors 460 are disposed on two sides (two straight parts) of the feeder element 440 extending in the left and right direction. One magnetic sensor 460 (e.g., the magnetic sensor 463) is disposed on one side, while two magnetic sensors 460 (e.g., the magnetic sensors 464 and 465) on the other side. Positional offset in the up and down direction with respect to the receiver element 510 is determined by comparing the output signal of the magnetic sensor 463 with the output signal of the magnetic sensors 464 and/or 465. Also, positional offset of the feeder element 440 in the left and right direction with respect to the receiver element 510 is determined by comparing the output signals of the magnetic sensor 464 and the magnetic sensor 465.

Figure 35:
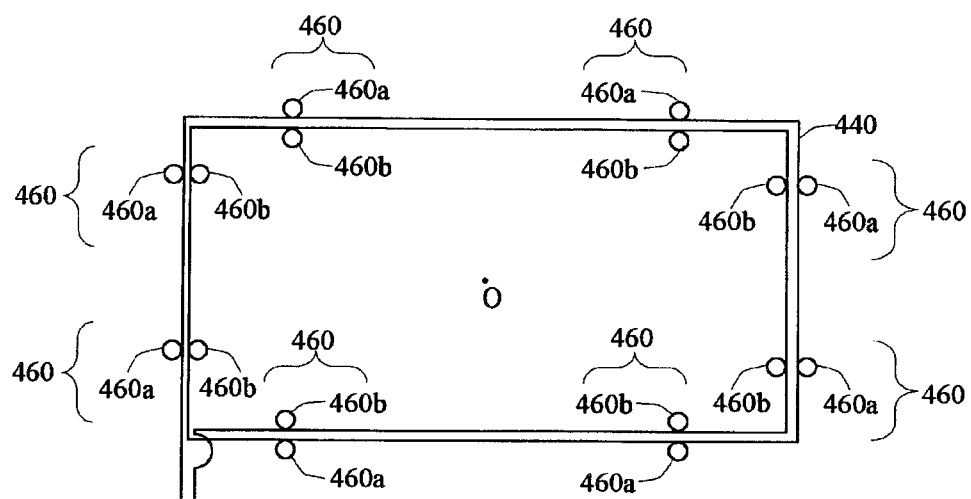
FIG. 35 is a plan view of a sixth layout example of magnetic sensors.

The controller 420 determines positional offset in two-dimensional directions based on the positional offset in the up and down direction and in the left and right direction thus determined. There are no particular restrictions on the number of magnetic sensors 460. However, the position and/or direction of the receiver element 510 can be determined more accurately by disposing more magnetic sensors 460. For example, as shown in FIG. 35, the positional offset in the up and down direction or in the left and right direction with respect to the receiver element 510 can be determined for each side by disposing two magnetic sensors 460 on each side of the feeder element 440.

Figure 36:
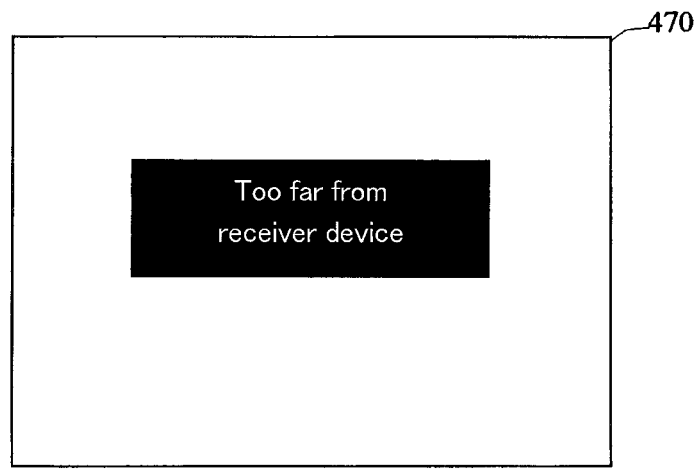
FIG. 36 is a schematic diagram of a fifth display example on a display component of the feeder device.
Figure 37:
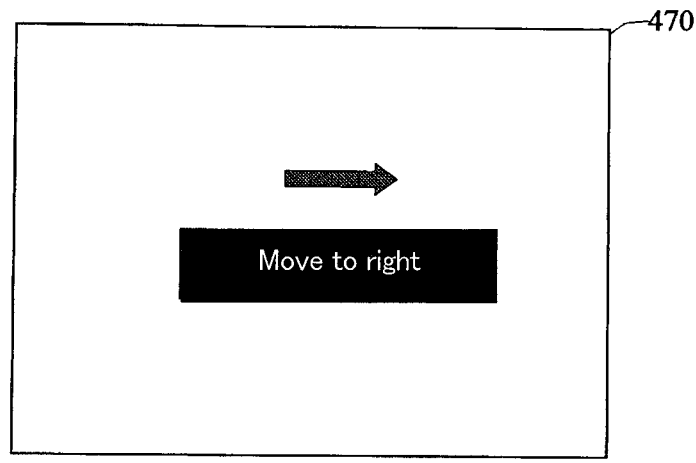
FIG. 37 is a schematic diagram of a sixth display example on the display component.
Figure 38:
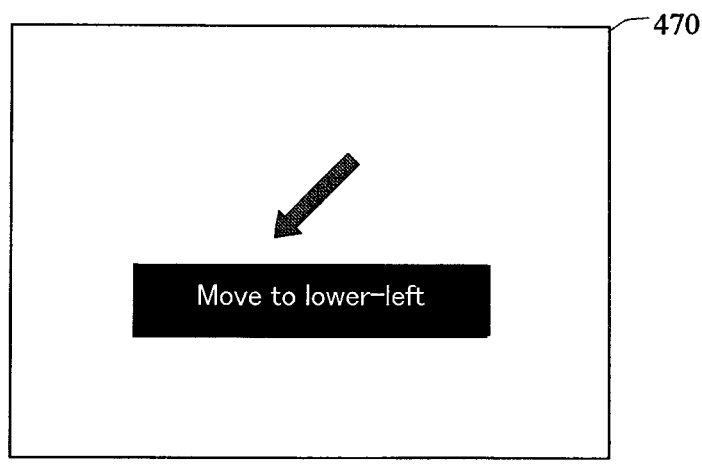
FIG. 38 is a schematic diagram of a seventh display example on the display component.

In step S13, the controller 420 displays the position and/or direction of the receiver element 510 on the display component 470 based on the positional relation between the receiver element 510 and the feeder element 440 determined in step S12. For example, if the layout of the magnetic sensor 460 is as shown in FIG. 30, then a display indicating how near or far the feeder element 440 is to or from the receiver element 510 is given as shown in FIG. 36. If the layout of the magnetic sensors 460 is as shown in FIG. 33, then a display indicating the one-dimensional direction of the receiver element 510 with respect to the center point O of the feeder element 440 as a reference is given as shown in FIG. 37. If the layout of the magnetic sensors 460 is as shown in FIGS. 34 and 35, then a display indicating the two-dimensional directions of the receiver element 510 with respect to the center point O of the feeder element 440 as a reference is given as shown in FIG. 38.

Figure 39:
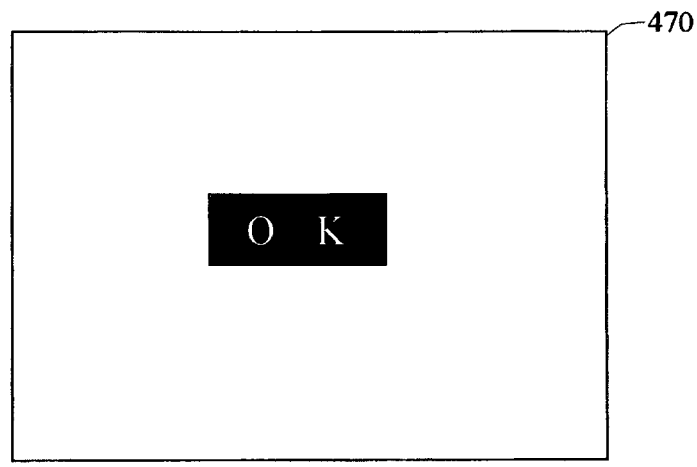
FIG. 39 is a schematic diagram of an eighth display example on the display component.

In the layout of the magnetic sensor 460 shown in FIG. 30, when the difference between the output signal of the magnetic sensor 460 and the specific threshold is at or below a specific value, no positional offset has occurred between the receiver element 510 and the feeder element 440, or if it has occurred, it is so minor that it can be ignored. Also, when the difference between the output signals of the magnetic sensors 460 in the layout of the magnetic sensors 460 shown in FIGS. 33 to 35 is at or below a specific value, no positional offset has occurred between the receiver element 510 and the feeder element 440, or if it has occurred, it is so minor that it can be ignored. In this case, the controller 420 does not need to display anything on the display component 470, or can give a display indicating that no positional offset has occurred, as shown in FIG. 39, for example.

In step S14, the controller 420 determines whether or not power feed to the receiver element 510 has ended. If power feed has not ended (No in step S14), then the flow returns to step S11. With this configuration, if the feeder device 400 is moved, then the display indicating the position and/or direction of the receiver element 510 is updated. If power feed has ended (Yes in step S 14), then the processing is concluded.

Alternatively or additionally, when power feed to the receiver element 510 has not yet ended, it can be determined in step S13 whether or not a specific length of time has elapsed since the display indicating the position and/or direction of the receiver element 510 was given. If this length of time has elapsed, the flow returns to step S13. With this configuration, the display is refreshed at regular time intervals.

In the illustrated embodiment, the feeder device includes the magnetic sensor (e.g., the sensor), the feeder element, and the controller (e.g., the notification component or notification means). The magnetic sensor detects the strength of a magnetic field (e.g., the magnetic field strength). The feeder element generate a magnetic field. The feeder element performs the non-contact transmission of electrical power (e.g., the non-contact electrical power transmission) to the receiver element of the receiver device. The controller makes a notification related to the positional offset between the feeder element and the receiver element based on output signal from the magnetic sensor. In other words, the controller notifies the positional offset between the feeder element and the receiver element based on the output signal indicative of the magnetic field strength.

The magnetic sensor is disposed at a position where it is less likely that a signal indicating the strength of the magnetic field generated from the feeder element when current flows to the feeder element will be included in the output signal of the magnetic sensor. In other words, the magnetic sensor is arranged with respect to the feeder element such that an effect of the magnetic field generated by the feeder element on the output signal is suppressed.

Thus, the output signal of the magnetic sensor mainly includes a signal indicating the strength of the magnetic field generated from the receiver element. The feeder device transmits power in a non-contact manner to the receiver device, and the receiver element receives the transmission of power from the feeder element. The position and/or direction of the receiver element can then be accurately detected based on the output signal of the magnetic sensor. The notification can be given related to the positional offset between the feeder element and the receiver element.

In the illustrated embodiment, the magnetic field generated from the feeder element has a first region and a second region with mutually opposite orientations of the magnetic flux. The magnetic sensor is disposed at a position where the strength of the magnetic field of the first region and the strength of the magnetic field of the second region can be detected. In other words, the magnetic sensor is arranged with respect to the feeder element such that the magnetic sensor is configured to detect the magnetic field strength in first and second regions, respectively. The magnetic field generated by the feeder element has mutually opposite magnetic flux orientations in the first and second regions, respectively.

In the illustrated embodiment, the detected strength of the magnetic field of the first region and the strength of the magnetic field of the second region are added together. This makes it less likely that a signal indicating the strength of the magnetic field generated from the feeder element will be included in the output signal of the magnetic sensor. In other words, the magnetic sensor is arranged with respect to the feeder element such that the magnetic field strength detected in the first and second regions cancels out with respect to each other. Thus, the position and/or direction of the receiver element can be detected more accurately.

In the illustrated embodiment, the controller calculates the one- or two-dimensional positional offset direction of the receiver element with respect to the feeder element, and gives the notification of the direction of the receiver element. In other words, the controller calculates either one-dimensional or two-dimensional positional offset direction of the receiver element with respect to the feeder element based on the output signal. The controller notifies the positional offset direction of the receiver element. Thus, the user can transmit power to the receiver element more efficiently by moving the feeder device based on this notification.

In the illustrated embodiment, the controller gives a notification indicating that there is no positional offset when the positional offset between the receiver element and the feeder element is below a specific threshold based on the output signal of the magnetic sensor. In other words, the controller notifies that there is no positional offset while the positional offset between the receiver element and the feeder element is below a specific threshold based on the output signal. Thus, the user can efficiently transmit power to the receiver element by maintaining the current position of the feeder device.

Fourth Embodiment

Referring now to FIGS. 40 to 49, a non-contact power feed system in accordance with a fourth embodiment will now be explained. In view of the similarity between the third and fourth embodiments, the parts of the fourth embodiment that are functionally identical to the parts of the third embodiment will be given the same reference numerals as the parts of the third embodiment. Moreover, the descriptions of the parts of the fourth embodiment that are identical to the parts of the third embodiment may be omitted for the sake of brevity.

In the third embodiment, a magnetic resistance element is used as the magnetic sensor 460. In the fourth embodiment, a less expensive pickup coil is used as the magnetic sensor 460. This pickup coil include a circular pickup coil (or loop coil), and a figure-eight pickup coil.

Figure 40:
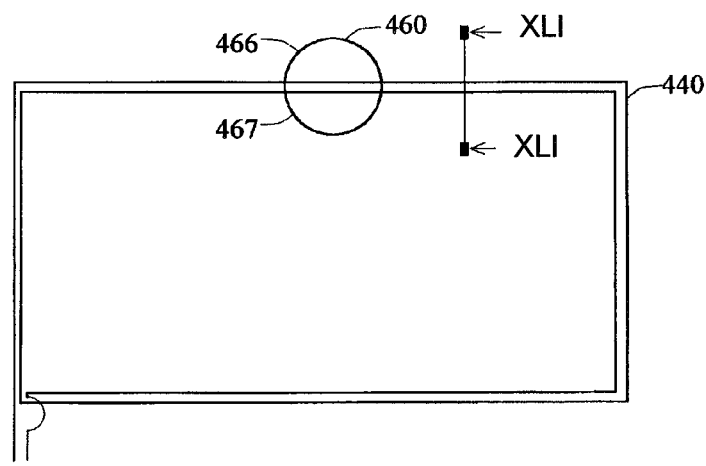
FIG. 40 is a plan view of a second example of the internal configuration of a feeder device in accordance with a fourth embodiment.
Figure 41:
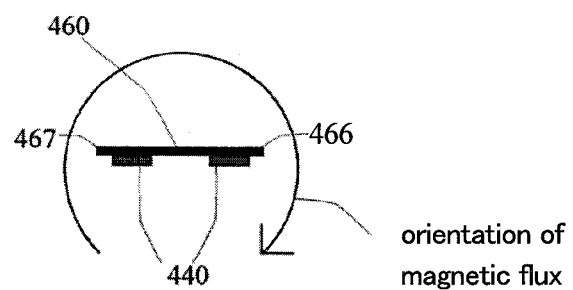
FIG. 41 is a cross sectional view of the feeder device, taken along XLI-XLI line in FIG. 40.
Figure 42:
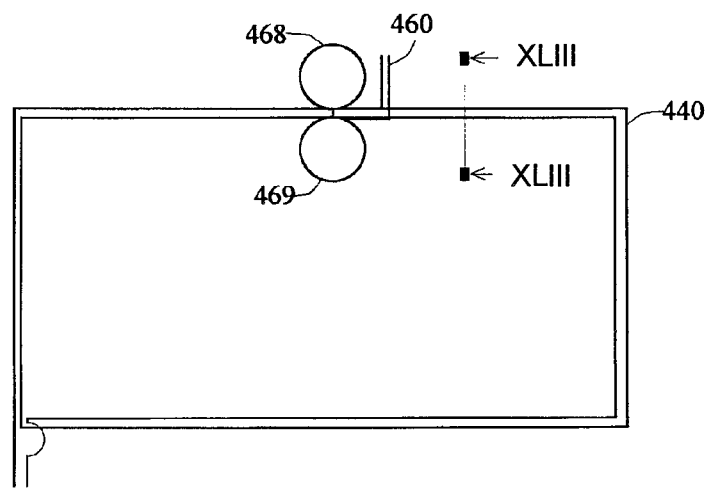
FIG. 42 is a plan view of a third example of the internal configuration of a feeder device in accordance with a fourth embodiment.
Figure 43:
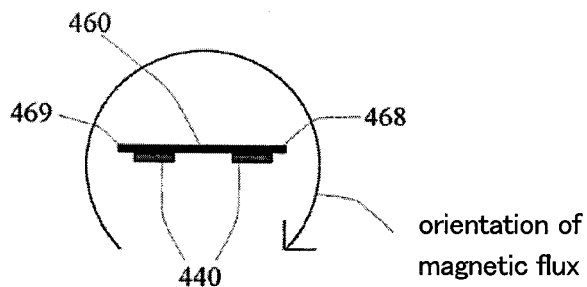
FIG. 43 is a cross sectional view of the feeder device, taken along XLIII-XLIII line in FIG. 42.

FIG. 40 is a plan view of a second example of the internal configuration of the feeder device 400. FIG. 41 is a lateral cross section along XLI-XLI line in FIG. 40. FIG. 42 is a plan view of a third example of the internal configuration of the feeder device 400. FIG. 43 is a lateral cross section along XLIII-XLIII line in FIG. 42. In the illustrated embodiment, as shown in FIGS. 40 and 41, the feeder device 400 includes a circular pickup coil as the magnetic sensor 460. Alternatively, as shown in FIGS. 42 and 43, the feeder device 400 includes a figure-eight pickup coil as the magnetic sensor 460. The magnetic sensor 460 is also called the pickup coil 460 below.

As shown in FIGS. 40 and 41, as viewed in a direction perpendicular to the paper plane in FIG. 40, the magnetic field generated from the feeder element 440 is separated into a magnetic field generated in the first region outside of the feeder element 440 (e.g., a first magnetic field) and a magnetic field generated in the second region inside of the feeder element 440 (e.g., a second magnetic field). The orientations of the magnetic flux of these magnetic fields are mutually opposite, as shown in FIG. 41. The circular pickup coil 460 includes first and second sensor components 466 and 467. The first sensor component 466 detects the strength of the magnetic field of part of the first region, while the second sensor component 467 detects the magnetic field of part of the second region. The detector 450 obtains the strength of the magnetic field by adding together the strength of the magnetic field of the feeder element 440 detected by the first sensor component 466 and the strength of the magnetic field of the feeder element 440 detected by the second sensor component 467. The detector 450 further outputs the obtained strength of the magnetic field to the controller 420 as the strength of the magnetic field of the feeder element 440 detected by the pickup coil 460.

As shown in FIG. 40, the first sensor component 466 and the second sensor component 467 are disposed so as to detect the strength of the magnetic field of part of the first region and part of the second region, respectively. Furthermore, as shown in FIG. 41, the orientation of the magnetic flux detected by the first sensor component 466 and the orientation of the magnetic flux detected by the second sensor component 467 are substantially opposite directions. Therefore, if the absolute values of the strength of the magnetic field of the feeder element 440 detected by the first sensor component 466 and the second sensor component 467 are substantially the same, then the strength of the magnetic field of the feeder element 440 detected by the pickup coil 460 as calculated by adding together the two output signals will be substantially zero. That is, it will be less likely that a signal indicating the strength of the magnetic field of the feeder element 440 will be included in the output signal of the pickup coil 460. Thus, the pickup coil 460 will function mainly as a sensor for detecting the strength of the magnetic field of the receiver element 510 when the receiver element 510 and the feeder element 440 are moved close together.

Similarly, as shown in FIGS. 42 and 43, the figure-eight-shaped pickup coil 460 includes a first coil 468 and a second coil 469. The first coil 468 and the second coil 469 are respectively disposed at a position where the strength of part of the magnetic field outside of the feeder element 440 (e.g., the first region) is detected, and a position where the strength of part of the magnetic field inside of the feeder element 440 (e.g., the second region) is detected. The detector 450 obtains the strength of the magnetic field by adding together the strength of the magnetic field of the feeder element 440 detected by the first coil 468 and the strength of the magnetic field of the feeder element 440 detected by the second coil 469. The detector 450 outputs the strength of the magnetic field to the controller 420 as the strength of the magnetic field of the feeder element 440 detected by the pickup coil 460.

As shown in FIG. 43, the first coil 468 and the second coil 469 are disposed so as to detect the strength of the magnetic field in the first region and the second region, respectively. The orientation of the magnetic flux detected by the first coil 468 and the orientation of the magnetic flux detected by the second coil 469 are substantially opposite directions. Therefore, if the absolute values of the strength of the magnetic field of the feeder element 440 detected by the first coil 468 and the second coil 469 are substantially the same, then the strength of the magnetic field of the feeder element 440 detected by the pickup coil 460 as calculated by adding together the two output signals will be substantially zero. That is, it will be less likely that a signal indicating the strength of the magnetic field of the feeder element 440 will be included in the output signal of the pickup coil 460. Thus, the pickup coil 460 will function mainly as a sensor for detecting the strength of the magnetic field of the receiver element 510 when the receiver element 510 and the feeder element 440 are moved close together.

This embodiment provides the same effect as the third embodiment. In addition, an inexpensive pickup coil is used as the magnetic sensor. Thus, the cost of the RF reader can be decreased.

In the above-mentioned third and fourth embodiments, the controller 420 gives a display on the display component 470 indicating the position and/or direction of the receiver element 510 to notify the user about the position and/or direction of the receiver element 510. In other words, the controller 420 is an example of the notification component (or notification means) of the present invention. However, the position and/or direction of the receiver element 510 can instead be conveyed to the user by some method other than a display. For instance, the position and/or direction of the receiver element 510 can be conveyed by sound emitted from a speaker. Specifically, as long as the position and/or direction of the receiver element 510 can be recognized, any notification method can be employed.

In the third and fourth embodiments, when the feeder device 400 includes two magnetic sensors 460, the one-dimensional direction of the receiver element 510 is determined. However, two-dimensional directions can be determined when the feeder device 400 further has an acceleration sensor that detects the movement direction of the feeder device 400.

Figure 44:
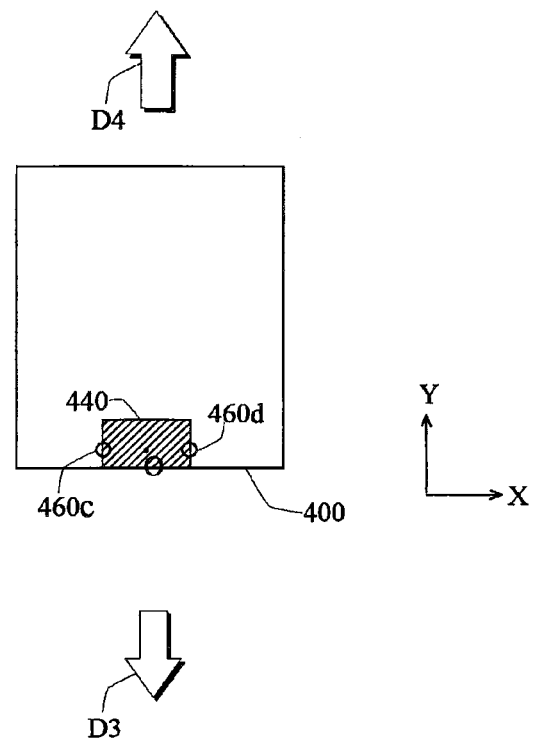
FIG. 44 is a plan view of a modification example of a feeder element of the feeder device.

This will be described in detail through reference to FIG. 44. FIG. 44 is a diagram illustrating a modification example of the feeder device 400. The feeder device 400 has pickup coils 460c and 460d as magnetic sensors 460. With this configuration, if the strength of the magnetic field of the output signal of the pickup coil 460d is higher than that of the output signal of the pickup coil 460c, then it is determined that the receiver element 510 is present in the direction towards the pickup coil 460d (right direction) with respect to the center point O of the feeder element 440 as a reference. In addition, fluctuation in the strength of the magnetic field detected by the pickup coils 460c and 460d can also be utilized. For example, if the strength of the magnetic field detected by the pickup coils 460c and 460d weakens while the feeder device 400 is moved in the direction of the arrow D3, then it can be determined that the receiver element 510 is present in the upward direction. That is, the receiver element 510 is determined to be present in the right direction and the upward direction (that is, the upper-right direction) from the feeder device 400.

Meanwhile, if the strength of the magnetic field detected by the pickup coils 460c and 460d weakens while the feeder device 400 is moved in the direction of the arrow D4, then it can be determined that the receiver element 510 is present in the downward direction. That is, the receiver element 510 is determined to be present in the right direction and the downward direction (that is, the lower-right direction) from the feeder device 400.

In the third and fourth embodiments, the output signal of one magnetic sensor 460 is compared with a threshold, or the output signals of two or more magnetic sensors 460 are compared with respect to each other. Then, the one-dimensional direction or two-dimensional directions of the receiver element 510 are indicated. However, alternatively, the centroid coordinates P of the magnetic field generated from the receiver element 510 can be calculated, and the direction of the centroid coordinates P relative to the center point O of the feeder element 440 as a reference can be determined as the direction of the receiver element 510.

When the positional coordinates of a j-th magnetic sensor 460 are $(X_j, Y_j)$, and the output signal of the magnetic sensor 460 is Hj (A/m), then the centroid coordinates P (X, Y) of the magnetic field generated from the receiver element 510 satisfy the following equations (3) and (4).

$$\Sigma(X_j-X)Hj=0 \quad (3)$$

$$\Sigma(Y_j-Y)Hj=0 \quad (4)$$

Figure 45:
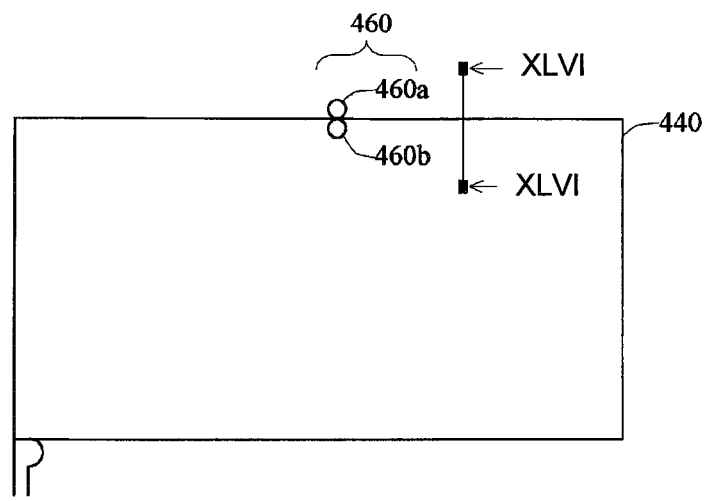
FIG. 45 is a plan view of a fifth modification example of an antenna coil.
Figure 46:
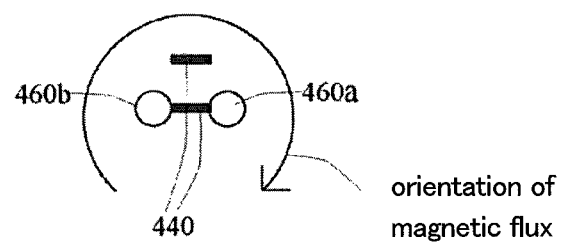
FIG. 46 is a cross sectional view of the feeder device, taken along XLVI-XLVI line in FIG. 45.

In the third and fourth embodiments, a loop antenna wound in a flat spiral is used as the feeder element 440. However, this is not the only option. For example, a loop antenna with a three-dimensional spiral shape can be used as shown in FIGS. 45 and 46. In other words, in this example, the spiral shape extends in an axial direction of the feeder element 440. FIGS. 45 and 46 are modification examples of the feeder elements 440 shown in FIGS. 30 and 31, respectively. However, this loop antenna can be applied to the feeder element 440 in other embodiments.

Here, the strength of the magnetic field of the feeder element 440 generated in the first region, and the strength of the magnetic field of the feeder element 440 generated in the second region will be further described. In the above embodiments, the strength of the magnetic field generated in the second region of the spiral feeder element 440 is affected by the magnetic field generated from all parts (the four sides) of the feeder element 440, while the strength of the magnetic field generated in the first region is mainly affected by the magnetic field generated from just one part (one side) of the feeder element 440. Therefore, the strength of the magnetic field in the second region is generally higher than the strength of the magnetic field in the first region.

Figure 47:
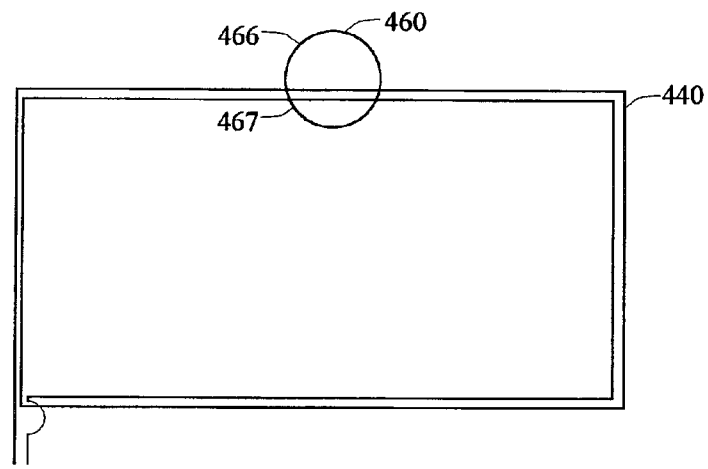
FIG. 47 is a plan view of a sixth modification example of an antenna coil.
Figure 48:
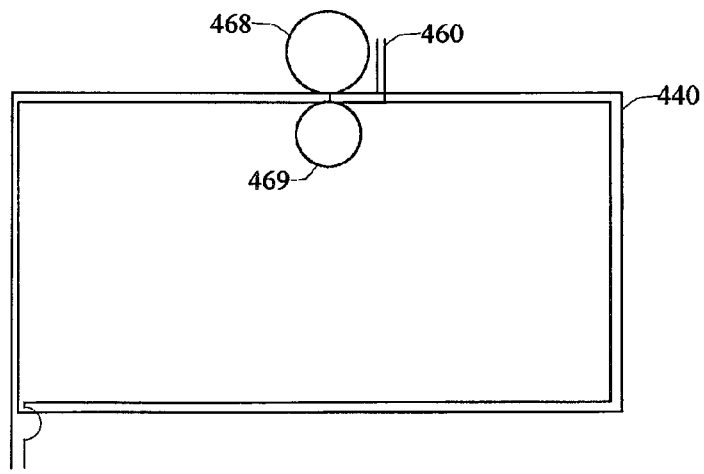
FIG. 48 is a plan view of a seventh modification example of an antenna coil.

As shown in FIGS. 47 and 48, when the magnetic sensors 460 are pickup coils, the sensors that detect the strength of the magnetic field in the second region of the magnetic sensors 460 (the second sensor component 467 and the second coil 469) can be made smaller than the sensors that detect the strength of the magnetic field in the first region (the first sensor component 466 and the first coil 468). This makes the sum of the strength of the magnetic field of the feeder element 440 detected by the magnetic sensor 460 substantially zero.

Figure 49:
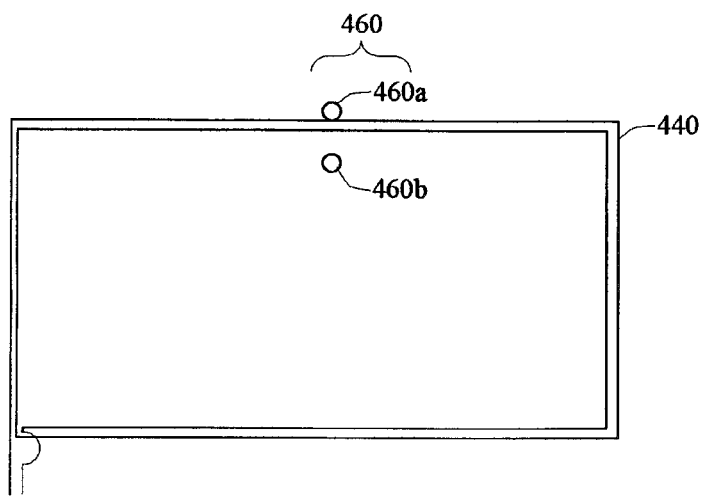
FIG. 49 is a plan view of an eighth modification example of an antenna coil.

Also, when the magnetic sensor 460 is a magnetic resistance element as shown in FIGS. 30 and 31, the position at which the magnetic sensor 460a detects the strength of the magnetic field in the first region can be set closer than the position at which magnetic sensor 460b detects the strength of the magnetic field in the second region with respect to the part of the feeder element 440 that generates the magnetic field detected by the magnetic sensors 460a and 460b, as shown in FIG. 49.

That is, when the strength of the magnetic field of the first region and the strength of the magnetic field of the second region are different, the magnetic sensor 460 is disposed such that the detection of the strength of the magnetic field in the region with the stronger magnetic field will be suppressed more than detection of the strength of the magnetic field in the region with the weaker magnetic field. In other words, the magnetic field generated by the feeder element has a larger strength in the second region than in the first region. The magnetic sensor is arranged with respect to the feeder element such that detection of the magnetic field strength in the second region is suppressed more than detection of the magnetic field strength in the first region.

Also, alternatively, the strength of the magnetic field of the feeder element 440 detected by the magnetic sensor 460 can be set to substantially zero by adjusting the gain of the output signal of the magnetic field in the first region and/or the output signal of the magnetic field in the second region.

Figure 50:
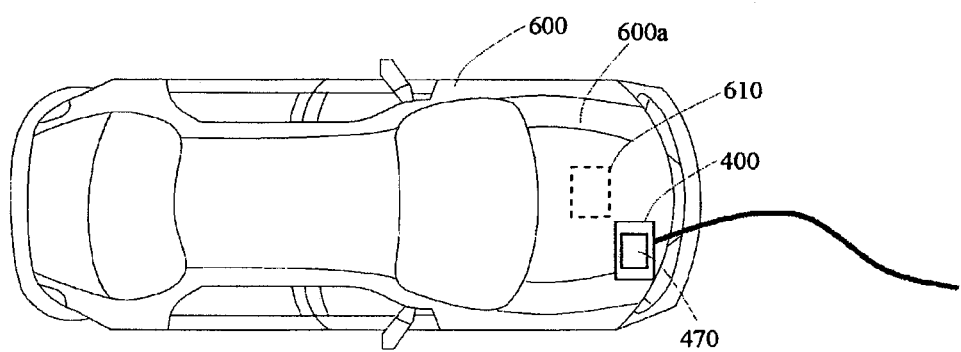
FIG. 50 is a schematic diagram of a second example of a non-contact power feed system.

In the third and fourth embodiments above, while the power is fed to a portable electronic device such as a smart phone or a tablet terminal, the power can be fed to other than electronic devices. For example, the power can be fed to a vehicle 600 equipped with a receiver element 610 as shown in FIG. 50. In the illustrated embodiment, while a passenger vehicle 600 is illustrated as an example in FIG. 50, this can instead be a motorcycle, a bicycle, a chair walker, or another such light vehicle.

As shown in FIG. 50, the receiver element 610 is disposed in the approximate center of a hood 600a of the vehicle or automobile 600. The power is supplied by moving the feeder device 400 close to the receiver element 610. Here again, the position and/or direction of the receiver element 610 is accurately detected based on the output signal of the magnetic sensor of the feeder device 400. The user is notified about positional offset between the feeder element of the feeder device 400 and the receiver element 610. The display component 470 displays information about the positional offset as explained above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A communication device comprising:
   an antenna that generates a magnetic field, and communicates with a wireless device that generates a magnetic field during communication;
   a sensor that detects magnetic field strength by receiving the magnetic field of the antenna and the magnetic field of the wireless device; and
   a notification component that notifies a positional offset between the antenna and the wireless device based on output signal indicative of the magnetic field strength detected by the sensor,
   the sensor being arranged with respect to the antenna with an effect of the magnetic field generated by the antenna on the output signal being suppressed.

2. The communication device according to claim 1, wherein
   the sensor is arranged with respect to the antenna with the sensor detecting the magnetic field strength in first and second regions, respectively, the magnetic field generated by the antenna having mutually opposite magnetic flux orientations in the first and second regions, respectively.

3. The communication device according to claim 2, wherein
   the sensor is arranged with respect to the antenna with the magnetic field strength detected in the first and second regions cancelling out with respect to each other.

4. The communication device according to claim 2, wherein
   the magnetic field generated by the antenna has a larger strength in the second region than in the first region, and
   the sensor is arranged with respect to the antenna with detection of the magnetic field strength in the second region being suppressed more than detection of the magnetic field strength in the first region.

5. The communication device according to claim 1, wherein the sensor includes a pickup coil.

6. The communication device according to claim 1, wherein
   the notification component further calculates a positional offset direction of the wireless device with respect to the antenna based on the output signal, the notification component further notifying the positional offset direction of the wireless device.

7. The communication device according to claim 1, wherein
   the notification component further notifies that there is no positional offset while the positional offset between the wireless device and the antenna is below a specific threshold based on the output signal.

8. A feeder device comprising:
   a feeder element that generates a magnetic field and performs a non-contact electrical power transmission to a receiver element of a receiver device that generates a magnetic field;
   a sensor that detects magnetic field strength by receiving the magnetic field of the feeder element and the magnetic field of the receiver element; and
   a notification component that notifies a positional offset between the feeder element and the receiver element based on output signal indicative of the magnetic field strength detected by the sensor,
   the sensor being arranged with respect to the feeder element with an effect of the magnetic field generated by the feeder element on the output signal being suppressed.

9. The feeder device according to claim 8, wherein
   the sensor is arranged with respect to the feeder element with the sensor detecting the magnetic field strength in first and second regions, respectively, the magnetic field generated by the feeder element having mutually opposite magnetic flux orientations in the first and second regions, respectively.

10. The feeder device according to claim 9, wherein
    the sensor is arranged with respect to the feeder element with the magnetic field strength detected in the first and second regions cancelling out with respect to each other.

11. The feeder device according to claim 9, wherein
    the magnetic field generated by the feeder element has a larger strength in the second region than in the first region, and
    the sensor is arranged with respect to the feeder element with detection of the magnetic field strength in the second region being suppressed more than detection of the magnetic field strength in the first region.

12. The feeder device according to claim 8, wherein the sensor includes a pickup coil.

13. The feeder device according to claim 8, wherein
    the notification component further calculates either one-dimensional or two-dimensional positional offset direction of the receiver element with respect to the feeder element based on the output signal, the notification component further notifying the positional offset direction of the receiver element.

14. The feeder device according to claim 8, wherein
    the notification component further notifies that there is no positional offset while the positional offset between the receiver element and the feeder element is below a specific threshold based on the output signal.

\* \* \* \* \*